(12) United States Patent
Higami et al.

(10) Patent No.: US 8,399,148 B2
(45) Date of Patent: *Mar. 19, 2013

(54) VARNISH FOR A SOLID POLYMER FUEL CELL

(75) Inventors: Makoto Higami, Chuo-ku (JP); Igor Rozhanskii, Chuo-ku (JP); Yoshitaka Yamakawa, Chuo-ku (JP); Nagayuki Kanaoka, Wako (JP); Kaoru Fukuda, Wako (JP); Ryoichiro Takahashi, Wako (JP); Hiroshi Shinkai, Wako (JP)

(73) Assignees: JSR Corporation, Tokyo (JP); Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/205,177

(22) Filed: Aug. 8, 2011

(65) Prior Publication Data

US 2012/0040271 A1    Feb. 16, 2012

Related U.S. Application Data

(62) Division of application No. 11/995,701, filed as application No. PCT/JP2006/313153 on Jun. 30, 2006, now Pat. No. 8,043,762.

(30) Foreign Application Priority Data

Jul. 15, 2005   (JP) ................................ 2005-207418

(51) Int. Cl.
*H01M 8/10* (2006.01)

(52) U.S. Cl. ......... 429/491; 429/482; 429/492; 429/493

(58) Field of Classification Search .......... 429/491–494, 429/482, 479, 523, 529; 528/125; 548/343.5, 548/170; 521/27, 30, 32, 33
See application file for complete search history.

(56) References Cited

U.S. PATENT DOCUMENTS

| 7,208,242 | B2 | 4/2007 | Asano et al. | |
| 7,658,867 | B2 | 2/2010 | Kanaoka et al. | |
| 7,906,608 | B2 * | 3/2011 | Higami et al. | 528/125 |
| 8,043,762 | B2 * | 10/2011 | Higami et al. | 429/493 |
| 2004/0044166 | A1 * | 3/2004 | Rozhanskii et al. | 528/86 |
| 2004/0097695 | A1 | 5/2004 | Yoon | |
| 2004/0166435 | A1 * | 8/2004 | Lee et al. | 430/270.1 |
| 2005/0064260 | A1 | 3/2005 | Otsuki et al. | |
| 2005/0069735 | A1 | 3/2005 | George, II et al. | |
| 2005/0124769 | A1 | 6/2005 | Haring | |
| 2005/0130024 | A1 | 6/2005 | Otsuki et al. | |
| 2006/0166047 | A1 | 7/2006 | Yoshimura et al. | |
| 2009/0130526 | A1 | 5/2009 | Higami et al. | |
| 2009/0149623 | A1 | 6/2009 | Higami et al. | |

FOREIGN PATENT DOCUMENTS

| CA | 2 482 061 A1 | 3/2005 |
| DE | 103 16 317 A1 | 11/2004 |
| EP | 0 731 520 A1 | 9/1996 |
| EP | 1 905 791 A1 | 4/2008 |
| JP | 2004-35891 | 2/2004 |
| JP | 2004-131533 | 4/2004 |
| JP | 2004-253267 | 9/2004 |
| JP | 2004-307718 | 11/2004 |
| JP | 2005-50726 | 2/2005 |
| JP | 2005-116517 | 4/2005 |
| JP | 2005-133092 | 5/2005 |
| KR | 10-2005-0013162 | 2/2005 |
| WO | WO 03/060012 A1 | 7/2003 |
| WO | WO 2005/072413 A2 | 8/2005 |
| WO | WO 2005/072413 A3 | 8/2005 |
| WO | WO 2005/086727 A2 | 9/2005 |
| WO | WO 2005/086727 A3 | 9/2005 |

OTHER PUBLICATIONS

Extended European Search Report issued Oct. 30, 2009, in Patent Application No. 06767731.0.

Hossein Ghassemi, et al., "New multiblock copolymers of sulfonated poly(4'-phenyl-2,5-benzophenone) and poly(arylene ether sulfone) for proton exchange membranes. II", Polymer, vol. 45, No. 17, XP 4546870, Aug. 5, 2004, pp. 5855-5862.

* cited by examiner

*Primary Examiner* — Raymond Alejandro

(74) *Attorney, Agent, or Firm* — Oblon, Spivak, McClelland, Maier & Neustadt, L.L.P.

(57) ABSTRACT

Provided is a varnish which contains a solvent and an electrode electrolyte for a solid polymer fuel cell electrolyte, which contains a polymer with a structure having a main chain including a polyphenylene, a side chain including a sulfonic acid group and a repeating structural unit as a side chain including a nitrogen-containing heterocyclic group.

5 Claims, 1 Drawing Sheet

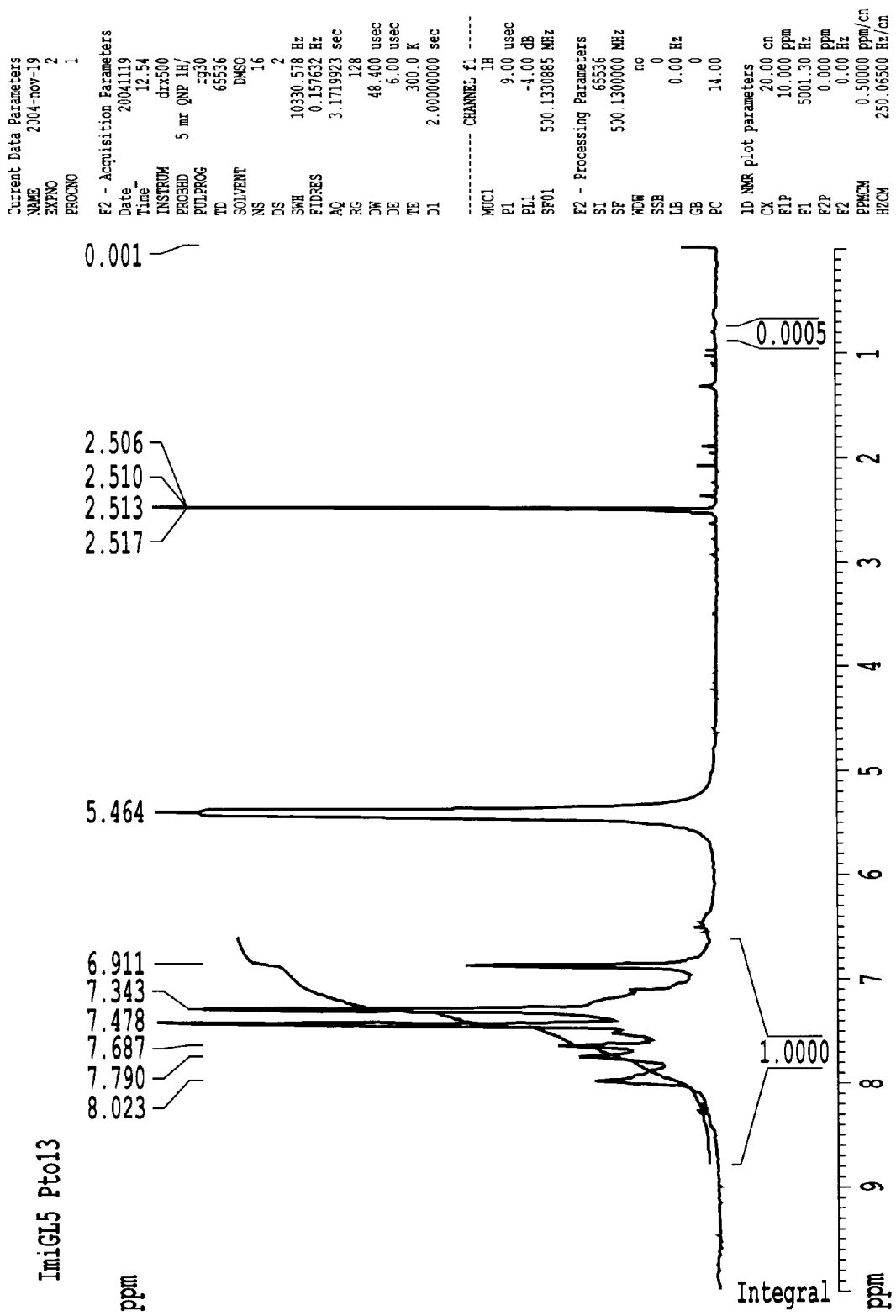

VARNISH FOR A SOLID POLYMER FUEL CELL

This application is a Divisional of U.S. application Ser. No. 11/995,701, now U.S. Pat. No. 8,043,762, filed on Jan. 15, 2008, which is the National Stage of PCT/JP2006/313153, filed on Jun. 30, 2006.

FIELD OF THE INVENTION

The present invention relates to an electrode electrolyte for a solid polymer-type fuel cell containing a particular polymer composition, an electrode paste, an electrode and a membrane-electrode junction.

BACKGROUND OF THE INVENTION

A solid polymer-type fuel cell may be miniaturized to reduce weight because of generation of high power density and low temperature operability and is expected to be put in practical use as a power source for automobiles, a power source for stationary electric power generation, power generation equipment for mobile devices and the like.

A solid polymer-type fuel cell is provided with a pair of electrodes disposed on both sides of a proton conductive solid polymer electrolyte membrane, and generates electric power by supplying pure hydrogen or reformed hydrogen as a fuel gas to one electrode (fuel electrode) and an oxygen gas or air as an oxidant to the other electrode (air electrode).

An electrode for such a fuel cell is composed of an electrode electrolyte on which a catalyst component is dispersed (hence this electrode may be called an electrode catalyst layer in some cases), and the electrode catalyst layer on the fuel electrode side generates protons and electrons from the fuel gas, while the electrode catalyst layer on the air electrode side generates water from oxygen, protons and electrons, enabling the solid polymer electrolyte membrane to ionically conduct protons. Thus, electric power is generated from such electrode catalyst layers.

A conventional solid polymer-type fuel cell has used a perfluoroalkylsulfonic acid-type polymer represented by Nafion (trademark) as an electrode electrolyte. Although this material is excellent in proton conductivity, it is very expensive and its low combustibility resulting from many fluorine atoms within its molecule makes it very difficult to recover and recycle expensive noble metals such as platinum used as an electrode catalyst.

On the other hand, various non-perfluoroalkylsulfonic acid-type polymers have been investigated as alternative materials. In aim to use those at a high temperature condition where the efficiency of power generation is high, high heat-resistant aromatic sulfonic acid-type polymers is attempted to use as an electrode electrolyte, particularly with a view to an application under For example, Japanese Patent Laid-Open Publication No. 2005-50726 (Patent Document 1) has disclosed the use of sulfonated polyarylene polymers as an electrode electrolyte and furthermore, Japanese Patent Laid-Open Publication No. 2004-253267 (Patent Document 2) has disclosed the use of particular sulfonated polyarylenes.

Patent Document 1: Japanese Patent Laid-Open Publication No. 2005-50726
Patent Document 2: Japanese Patent Laid-Open Publication No. 2004-253267

DISCLOSURE OF THE INVENTION

Problems to be Solved by the Invention

However, such materials conventionally known as an electrolyte in some cases developed a reversible elimination reaction of the sulfonic acid group or a cross-linking reaction involving the sulfonic acid under a high temperature. This causes such problems as lowering of power generation output of a fuel cell due to the lowered proton conductivity or the embrittlement of a membrane and the like and failure to generate power due to the rupture of the membrane.

At present, a fuel cell is used after setting an upper limit of a temperature during power generation by fuel cell to avoid such problems as much as possible, thus limiting an output of power generation.

Means for Solving The Problems

The present invention was undertaken to solve the above problems and found that introduction of nitrogen-containing heterocyclic aromatic groups into a polymer containing sulfonic acid groups improved stability of sulfonic acid groups under high temperature conditions and suppressed the elimination of the sulfonic acid groups and cross-linking reaction involving the sulfonic acid groups described above, thus solving the above problems.

Furthermore, such compositions contain no fluorine atom or in a substantially reduced amount even if contained so that a solution for the problem of recovering and recycling catalyst metals described above was also found to complete the present invention.

The embodiments of the present invention are as follows.
(1) An electrode electrolyte for a solid polymer-type fuel cell electrolyte, which has a polyphenylene structure as a main chain and both a sulfonic acid group and a nitrogen-containing heterocyclic group as a side chain.
(2) The electrode electrolyte for a solid polymer-type fuel cell electrolyte according to (1), wherein the side chain having a nitrogen-containing heterocyclic group has a structure represented by the following general formula (D).

(Formula 1)

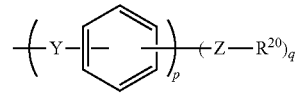

(D)

(In the formula, Z represents at least one kind of structures selected from the group consisting of a direct bond, —O— and —S—, Y represents at least one kind of structures selected from the group consisting of —CO—, —SO$_2$—, —SO—, —CONH—, —COO—, —(CF$_2$)$_l$— (l is an integer of 1 to 10) and —C(CF$_3$)$_2$— and R$^{20}$ represents a nitrogen-containing heterocyclic group. q represents an integer of 1 to 5 and p represents an integer of 0 to 4.)
(3) The electrode electrolyte for a solid polymer-type fuel cell according to (1) or (2), wherein the above nitrogen-containing heterocyclic group is at least one kind of groups derived from the compounds selected from the group consisting of nitrogen-containing heterocyclic compound including pyrrole, thiazole, isothiazole, oxazole, isoxazole, pyridine, imidazole, imidazoline, pyrazole, 1,3,5-triazine, pyrimidine, pyridazine, pyrazine, indole, quinoline, isoquinoline, purine, benzimidazole, benzoxazole, benzothiazole, tetrazole, tetrazine, triazole, carbazole, acridine, quinoxaline, quinazoline and derivatives thereof.

(4) The electrode electrolyte for a solid polymer-type fuel cell according to (1) to (3), wherein the side chain having a sulfonic acid group is represented by the following general formula (E).

(Formula 2)

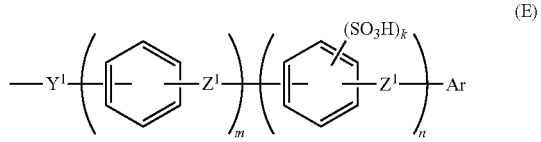

(E)

(In the formula, $Y^1$ represents at least one kind of structures selected from a group consisting of —CO—, —SO$_2$—, —SO—, —CONH—, —COO—, —(CF$_2$)$_1$— (1 is an integer of 1 to 10) and —C(CF$_3$)$_2$—, $Z^1$ represents at least one kind of structures selected from a group consisting of a direct bond, —(CH$_2$)$_1$— (1 is an integer of 1 to 10), —C(CH$_3$)$_2$—, —O— and —S— and Ar represents an aromatic group having a substituent represented by —SO$_3$H, —O(CH$_2$)$_h$SO$_3$H or —O(CF$_2$)$_h$SO$_3$H. h represents an integer of 1 to 12, m represents an integer of 0 to 10, n represents an integer of 0 to 10 and k represents an integer of 1 to 4.)

(5) The electrode electrolyte for a solid polymer-type fuel cell according to (1) to (4), wherein the above polymer contains a repeating structural unit represented by the following general formula (C) and a repeating unit represented by the following general formula (A).

(Formula 3)

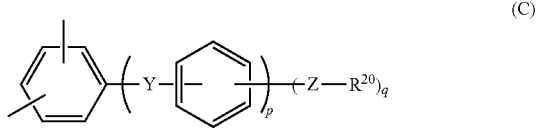

(C)

(In the formula, Z represents at least one kind of structures selected from the group consisting of a direct bond, —O— and —S—, Y represents at least one kind of structures selected from the group consisting of —CO—, —SO$_2$—, —SO—, —CONH—, —COO—, —(CF$_2$)$_1$— (1 is an integer of 1 to 10) and —C(CF$_3$)$_2$— and R$^{20}$ represents a nitrogen-containing heterocyclic group. q represents an integer of 1 to 5 and p represents an integer of 0 to 4.)

(Formula 4)

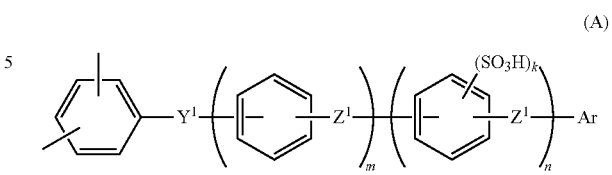

(A)

(In the formula, $Y^1$ represents at least one kind of structures selected from the group consisting of —CO—, —SO$_2$—, —SO—, —CONH—, —COO—, —(CF$_2$)$_1$— (1 is an integer of 1 to 10) and —C(CF$_3$)$_2$—, $Z^1$ represents at least one kind of structures selected from the group consisting of a direct bond, —(CH$_2$)$_1$— (1 is an integer of 1 to 10), —C(CH$_3$)$_2$—, —O— and —S— and Ar represents an aromatic group having a substituent represented by —SO$_3$H, —O(CH$_2$)$_h$SO$_3$H or —O(CF$_2$)$_h$SO$_3$H. h represents an integer of 1 to 12, m represents an integer of 0 to 10, n represents an integer of 0 to 10 and k represents an integer of 1 to 4.)

(6) The electrode electrolyte for a solid polymer-type fuel cell according to (1) to (5), wherein the polymer further has a structure represented by the following general formula (B).

(Formula 5)

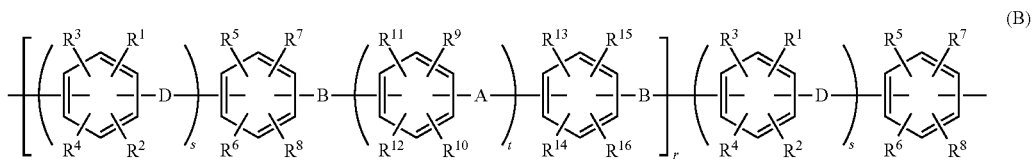

(B)

(In the formula, A and D independently represent at least one kind of structures selected from the group consisting of a direct bond, —CO—, —SO$_2$—, —SO—, —CONH—, —COO—, —(CF$_2$)$_1$— (1 is an integer of 1 to 10) and —(CH$_2$)$_1$— (1 is an integer of 1 to 10), —CR'$_2$— (R' represents an aliphatic hydrocarbon, an aromatic hydrocarbon or a halogenated hydrocarbon group), a cyclohexylidene, a fluorenylidene, —O— and —S—, Bis independently an oxygen or sulfur atom and R$^1$ to R$^{16}$ may be the same or different from one another and represent at least one kind of atoms or groups selected from the group consisting of hydrogen atom, fluorine atom, alkyl, partially or fully halogenated alkyl, allyl, aryl, nitro and nitrile. s and t represent an integer of 0 to 4 and r represents an integer of 0 or 1 or larger.)

(7) An electrode paste containing the electrolyte according to (1) to (6), catalyst particles and a solvent.

(8) An electrode for a solid polymer-type fuel cell containing the electrolyte according to (1) to (6) and catalyst particles.

(9) A membrane-electrode junction composed of a structure, wherein the electrode according to (8) is joined with at least one surface of a polymer electrolyte membrane.

Advantages of the Invention

The present invention solves such problems as the cost and the recovery of catalyst metals and also provides an electrode electrolyte for a solid polymer-type fuel cell excellent in proton conductivity, dimensional stability and heat resistance. Notably, by using a particular polymer as an electrode electrolyte, the present invention can suppress the sulfonic acid group from a reversible elimination reaction and a cross-linking reaction involving the sulfonic acid group, whereby the proton conductivity does not decrease and, moreover, the electrode electrolyte, having mechanical strength, can improve the output of power generation when used as an electrode electrolyte for a fuel cell because power generation is possible in a wide range of temperatures and humidity and particularly even at a high temperature.

Furthermore, the present invention provides an electrode paste, an electrode and a catalyst-loaded electrolyte membrane containing the electrolyte and contributes to improving performance in power generation of a solid polymer-type fuel cell.

BRIEF DESCRIPTION OF THE DRAWING

FIG. 1 shows a $^1$H-NMR spectrum of the compound obtained in Synthetic Example 1.

BEST MODE FOR CARRYING OUT THE INVENTION (Electrode Electrolyte)

The electrode electrolyte for a solid polymer-type fuel cell of the present invention contains a polymer having a main chain of a polyphenylene structure, a side chain of a sulfonic acid group and a side chain of a nitrogen-containing heterocyclic group.

(Polymer)

A polymer used in the present invention contains a structure with a main chain to be a polyphenylene structure and a structure with a side chain having a sulfonic acid group and a side chain having a nitrogen-containing heterocyclic group.

The polyphenylene structure forming the main chain represents a structure as follows, and the side chain represents a substituent $R^2$ in the following structure.

(Formula 6)

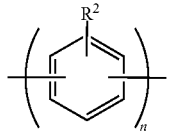

Side Chain

A side chain having a nitrogen-containing heterocyclic group in the present invention is represented by the following general formula (D).

(Formula 7)

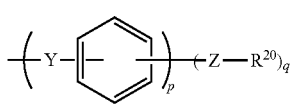

(D)

In formula, Z represents at least one kind of structures selected from the group consisting of a direct bond, —O— and —S— and Y represents at least one kind of structures selected from the group consisting of —CO—, —SO$_2$—, —SO—, —CONH—, —COO—, —(CF$_2$)$_l$— (l is an integer of 1 to 10) and —C(CF$_3$)$_2$—, and preferably —CO— and —SO—.

$R^{20}$ represents a nitrogen-containing heterocyclic group. The nitrogen-containing heterocyclic group is a group formed by abstracting a hydrogen atom bonded to a carbon or nitrogen atom from a nitrogen-containing heterocyclic compound or a derivative thereof, wherein the nitrogen-containing heterocyclic compound includes pyrrole, thiazole, isothiazole, oxazole, isoxazole, pyridine, imidazole, imidazoline, pyrazole, 1,3,5-triazine, pyrimidine, pyridazine, pyrazine, indole, quinoline, isoquinoline, purine, benzimidazole, benzoxazole, benzothiazole, tetrazole, tetrazine, triazole, carbazole, acridine, quinoxaline and quinazoline. The nitrogen-containing heterocyclic groups thereof optionally have substituents, which include, for example, alkyl groups such as methyl, ethyl, propyl and the like, aryl groups such as phenyl, tolyl, naphthyl and the like, cyano and a fluorine atom and the like.

q represents an integer of 1 to 5, preferably 1 or 2.
p represents an integer of 0 to 4, preferably 0 or 1.

A side chain having a sulfonic acid group is represented by the following general formula (E).

(Formula 8)

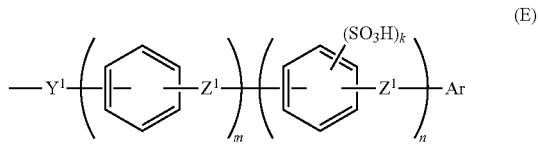

(E)

In general formula (E), $Y^1$ represents at least one kind of structures selected from the group consisting of —CO—, —SO$_2$—, —SO—, —CONH—, —COO—, —(CF$_2$)$_l$— (l is an integer of 1 to 10) and —C(CF$_3$)$_2$—. Among them, —CO— and —SO$_2$— are preferred.

$Z^1$ represents at least one kind of structures selected from a group consisting of a direct bond, —(CH$_2$)$_l$— (l is an integer of 1 to 10), —C(CH$_3$)$_2$—, —O— and —S—. Among them a direct bond and —O— are preferred.

Ar represents an aromatic group having a substituent represented by —SO$_3$H, —O(CH$_2$)$_h$SO$_3$H or —O(CF$_2$)$_h$SO$_3$H (h is an integer of 1 to 4).

The aromatic group specifically includes phenyl, naphthyl, anthryl, phenanthryl and the like. Among these groups, phenyl and naphthyl are preferred. The above aromatic group must be substituted with at least one of the above substituents represented by —SO$_3$H, —O(CH$_2$)$_h$SO$_3$H or —O(CF$_2$)$_h$SO$_3$H and preferably with two or more substituents in the case of naphthyl.

m is an integer of 0 to 10, preferably 0 to 2, n is an integer of 0 to 10, preferably 0 to 2 and k represents an integer of 1 to 4.

A preferred combination of values of m and n with structures of $Y^1$, $Z^1$ and Ar may include, (1) m=0, n=0 and a structure, in which $Y^1$ is —CO— and Ar is a phenyl group having —SO$_3$H as the substituent, (2) m=1, n=0 and a structure, in which $Y^1$ is —CO—, $Z^1$ is —O— and Ar is a phenyl group having —SO$_3$H as the substituent, (3) m=1, n=1, k=1 and a structure, in which $Y^1$ is —CO—, $Z^1$ is —O— and Ar is a phenyl group having —SO$_3$H as the substituent, (4) m=1, n=0 and a structure, in which $Y^1$ is —CO—, $Z^1$ is —O— and Ar is a naphthyl group having two —SO$_3$H as the substituent and (5) m=1, n=0 and a structure, in which $Y^1$ is —CO—, $Z^1$ is —O— and Ar is a phenyl group having —O(CH$_2$)$_4$SO$_3$H as the substituent.

$Y^1$ and $Z^1$ on side chains (D) and (E) may be the same or different.

Polymer

A polymer used in the present invention contains a repeating unit represented by the following general formulae (C) and (A).

(Formula 9)

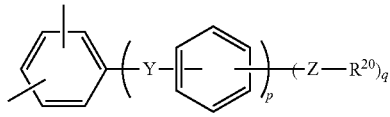

(C)

In general formula (C), Y, Z, $R^{20}$, q and p are similar to those described in general formula (D).

(Formula 10)

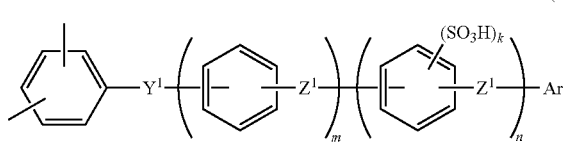

(A)

In general formula (A), $Y^1$, $Z^1$, Ar, m, n and k are identical with those in above formula (E).

A polymer further preferably contains a repeating unit represented by the following general formula (B).

(Formula 11)

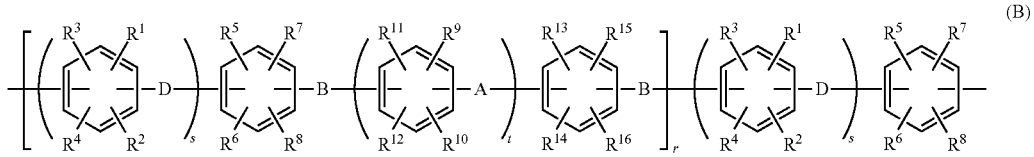

(B)

In general formula (B), A and D independently represent at least one kind of structures selected from the group consisting of a direct bond, —CO—, —SO$_2$—, —SO—, —CONH—, —COO—, —(CF$_2$)$_l$— (l is an integer of 1 to 10), —(CH$_2$)$_l$— (l is an integer of 1 to 10), —CR'$_2$— (R' represents aliphatic hydrocarbon, aromatic hydrocarbon or halogenated hydrocarbon group), cyclohexylidene, fluorenylidene, —O— and —S—. Specific examples of a structure represented by —CR'$_2$— herein include methyl, ethyl, propyl, isopropyl, butyl, isobutyl, t-butyl, octyl, decyl, octadecyl, phenyl, trifluoromethyl and the like.

Among them, a direct bond, —CO—, —SO$_2$—, —CR'$_2$— (R' represents aliphatic hydrocarbon, aromatic hydrocarbon or halogenated hydrocarbon group), cyclohexylidene, fluorenylidene and —O— are preferred.

B is independently an oxygen or sulfur atom, but an oxygen atom is preferred. $R^1$ to $R^{16}$ may be the same or different from one another and represent at least one kind of atoms or groups selected from the group of hydrogen atom, fluorine atom, alkyl, partially or fully halogenated alkyl, allyl, aryl, nitro and nitrile.

The alkyl group includes methyl, ethyl, propyl, butyl, amyl, hexyl, cyclohexyl, octyl and the like. The halogenated alkyl includes trifluoromethyl, pentafluoroethyl, perfluoropropyl, perfluorobutyl, perfluoropentyl, perfluorohexyl and the like.

The allyl group includes propenyl and the like. The aryl group includes phenyl, pentafluorophenyl and the like.

s and t represent an integer of 0 to 4. r represents an integer of 0 or 1 or larger and its upper limit is generally 100, preferably 1 to 80.

A preferred combination of values of s and t with structures of A, B, D and $R^1$ to $R^{16}$ includes (1) s=1, t=1 and a structure, in which A is —CR'$_2$— (R' represents aliphatic hydrocarbon, aromatic hydrocarbon or halogenated hydrocarbon group), cyclohexylidene and fluorenylidene, B is an oxygen atom, D is —CO— or —SO$_2$— and $R^1$ to $R^{16}$ are a hydrogen or fluorine atom, (2) s=1, t=0 and a structure, in which B is an oxygen atom, D is —CO— or —SO$_2$— and $R^1$ to $R^{16}$ are a hydrogen or fluorine atom and (3) s=0, t=1 and a structure, in which A is —CR'$_2$— (R' represents aliphatic hydrocarbon, aromatic hydrocarbon or halogenated hydrocarbon group), cyclohexylidene and fluorenylidene, B is an oxygen atom and $R^1$ to $R^{16}$ are a hydrogen or fluorine atom or nitrile.

The polymer used in the present invention is represented by the following general formula (F) and includes a repeating unit having the sulfonic acid group represented by above general formula (A) (sulfonic acid unit), a repeating unit lacking the sulfonic acid group represented by above general formula (B) (hydrophobic unit) and a nitrogen-containing heterocyclic group represented by above general formula (C) (nitrogen-containing heterocyclic aromatic unit) and a polymer represented.

(Formula 11)

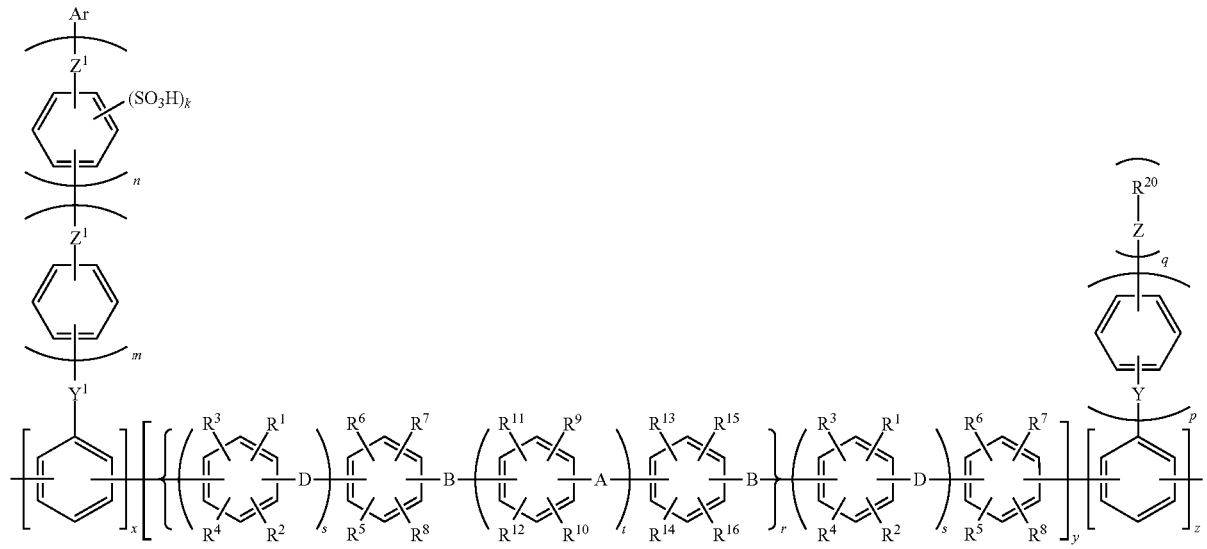

(F)

In general formula (F), A, B, D, Y, Z, $Y^1$, $Z^1$, Ar, k, m, n, p, q, r, s, t, $R^{20}$ and $R^1$ to $R^{16}$ each are similar to those in above general formulae (A), (B) and (C). x, y and z represent a molar ratio provided that x+y+z is equal to 100 mol %.

The above polymer contains a proportion of 0.5 to 99.9 mol %, preferably 10 to 99.5 mol % of the repeating structural unit represented by formula (A), that is, an x unit and 0.1 to 99.5 mol %, preferably 0.5 to 90 mol % of the repeating structural unit represented by formula (C), that is, a z unit. A content of the repeating structural unit represented by formula (B), that is, a y unit is optional, accounting for the rest of the sum of (A) and (C) and contains a proportion of 99.4 to 0.01 mol %, preferably 89.5 to 0.5 mol % when it is contained.

The proportion of the repeating structural unit represented by formula (C), that is, a z unit to the repeating structural unit represented by formula (A), that is, an x unit is 0.01 mol % to 50 mol %, preferably 0.1 mol % to 30 mol %, and more preferably 1 mol % to 25 mol %.

The ion exchange capacity of the polymer related to the present invention is generally 0.3 to 5 meq/g, preferably 0.5 to 3 meq/g, and more preferably 0.8 to 2.8 meq/g. When it is below 0.3 meq/g, proton conductivity is low and performance of power generation is low. On the other hand, when it exceeds 5 meq/g, water resistance is sometimes substantially reduced, which is not preferred.

The above ion exchange capacity may be adjusted by varying the kind, usage ratio and combination of structural units (A), (B) and (C). Therefore, such adjustments may be made by varying the ratio of an amount charged and the kind of precursors (monomers and oligomers) leading to structural units of (A) to (C) during polymerization.

Increase of the structural unit (A) generally increases the ion exchange capacity and proton conductivity, but decreases water resistance. On the other hand, when the structural unit (A) decreases, the ion exchange capacity decreases and water resistance increases, but proton conductivity decreases.

Inclusion of the structural unit (C) improves stability of the sulfonic acid group under high temperature conditions, thereby increasing heat resistance. A nitrogen atom in the nitrogen-containing heterocyclic aromatic compound has basicity to form ionic interaction with the sulfonic acid group. This increases stability of the sulfonic acid group and suppresses its elimination under high temperature conditions. This may also similarly suppress the cross-linking reaction between polymer molecules derived from the sulfonic acid group under high temperature conditions. The nitrogen-containing heterocyclic aromatic compound is a compound having an appropriate basicity allowing to achieve these effects without impairing proton conductivity.

The structural unit (B) is an arbitrary component, corresponding to a residual amount after subtracting components (A) and (C) in the polymer. (B) may be not necessarily contained. Inclusion of the structural unit (B) may ease adjustment of a molecular weight, a content of the above each repeating unit, extent of ion exchange, and others as well as yield a polymer having reduced swelling and eluting in hot water or a polymer that is thermally and chemically stable.

The molecular weight of the polymer is 10,000 to 1,000,000, preferably 20,000 to 800,000 as the weight average molecular weight relative to polystyrene standards determined by gel permeation chromatography (GPC).

(Production Method of Polymer)

Manufacture of the polymer having the sulfonic acid group uses, for example, three methods of A, B and C given below.

(Method A)

For example, similarly to a method disclosed in Japanese Patent Laid-Open Publication No. 2004-137444, the polymer may be synthesized by copolymerizing a monomer represented by the following general formula (A'), a monomer represented by the following general formula (B') and a monomer represented by the following general formula (C') to manufacture a polymer having a sulfonate ester group, which is then converted to the sulfonic acid group by de-esterification.

Monomer (A')

(Formula 13)

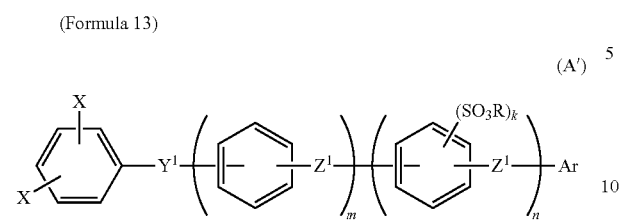

X represents an atom or group selected from a chlorine atom, a bromine atom and —$OSO_2R_b$ ($R_b$ herein represents alkyl, fluoro-substituted alkyl or aryl).

$Y^1$, $Z^1$, Ar, m, n and k are the same as those in general formula (A) and R represents an alkyl having 4 to 12 carbon atoms.

Specific examples of the compounds represented by general formula (A') include the compounds represented by the following general formula and the sulfonate esters according to Japanese Patent Laid-Open Publication No. 2004-137444, Japanese Patent Laid-Open Publication No. 2004-345997 and Japanese Patent Laid-Open Publication No. 2004-346163.

(Formula 14)

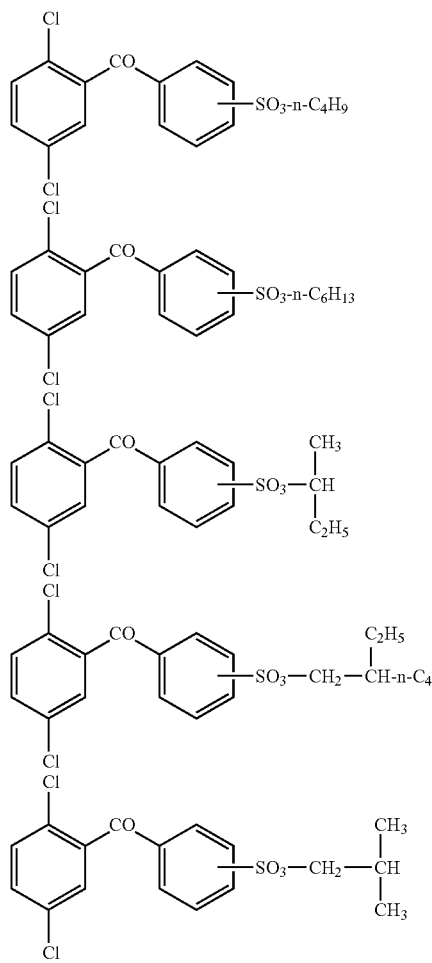

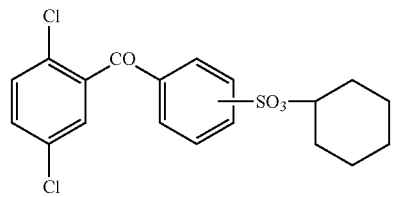

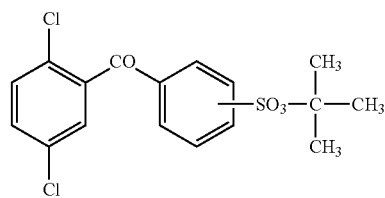

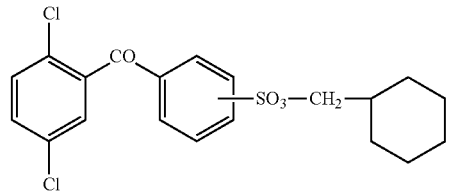

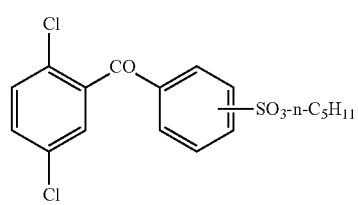

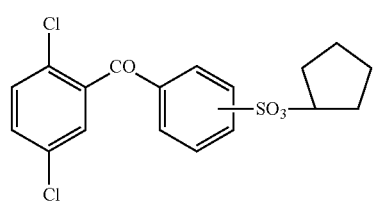

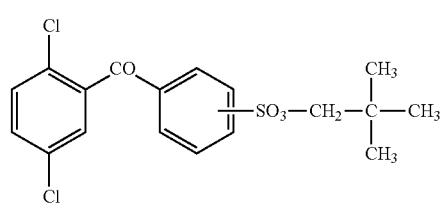

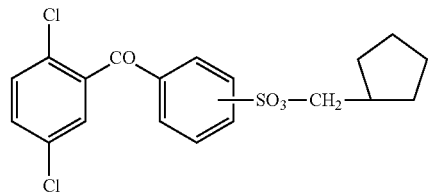

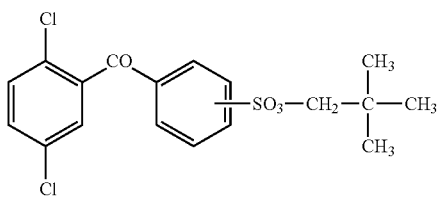

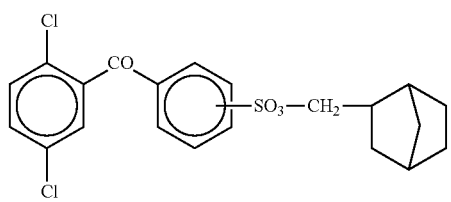

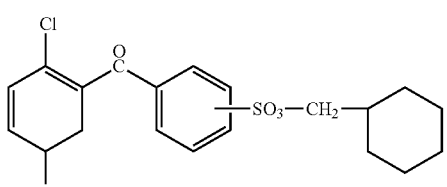

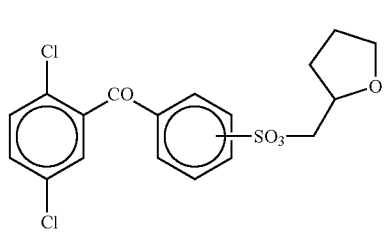

(Formula 15)

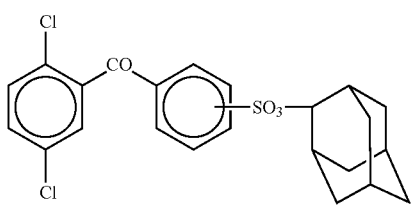

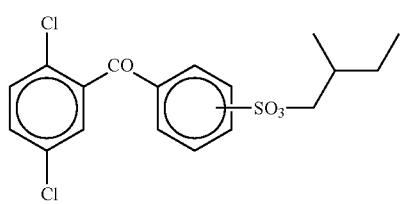

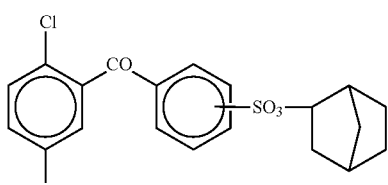

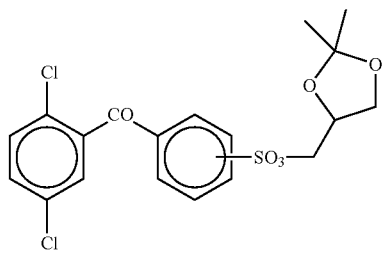

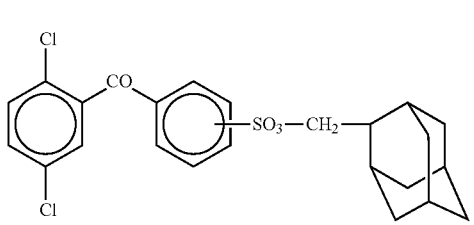

The sulfonate ester structure in the compounds represented by general formula (A') is bonded at a meta-position of the aromatic ring.

Monomer (B')

(Formula 16)

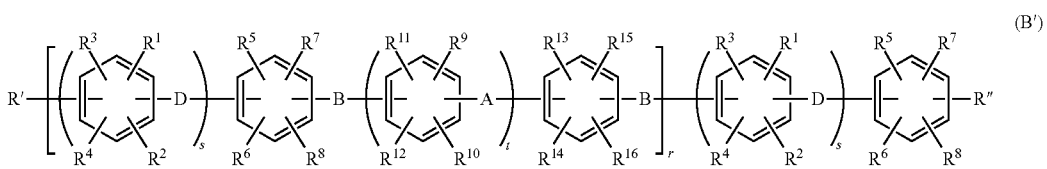

(B')

R' and R" represent an atom or group selected from a chlorine atom, a bromine atom or —OSO$_2$R$_b$ (R$_b$ herein represents alkyl, fluoro-substituted alkyl or aryl).

R$^1$ to R$^{16}$, A, B, D, s, t and r are the same as those in general formula (B).

Specific examples of monomer (B') include, when r=0 in general formula (B'), for example, 4,4'-dichlorobenzophenone, 4,4'-dichlorobenzanilide, 2,2-bis(4-chlorophenyl)difluoromethane, 2,2-bis(4-chlorophenyl)-1,1,1,3,3,3-hexafluoropropane, 4-chlorophenyl 4-chlorobenzoate, bis(4-chlorophenyl)sulfoxide, bis(4-chlorophenyl)sulfone and 2,6-dichlorobenzonitrile. In these compounds, the compounds in which a chlorine or bromine atom is substituted with an iodine atom may also be included.

When r is 1 in general formula (B'), the following compounds and the compounds disclosed in Japanese Patent Laid-Open Publication No. 2003-113136 may also be included.
(Formula 17)
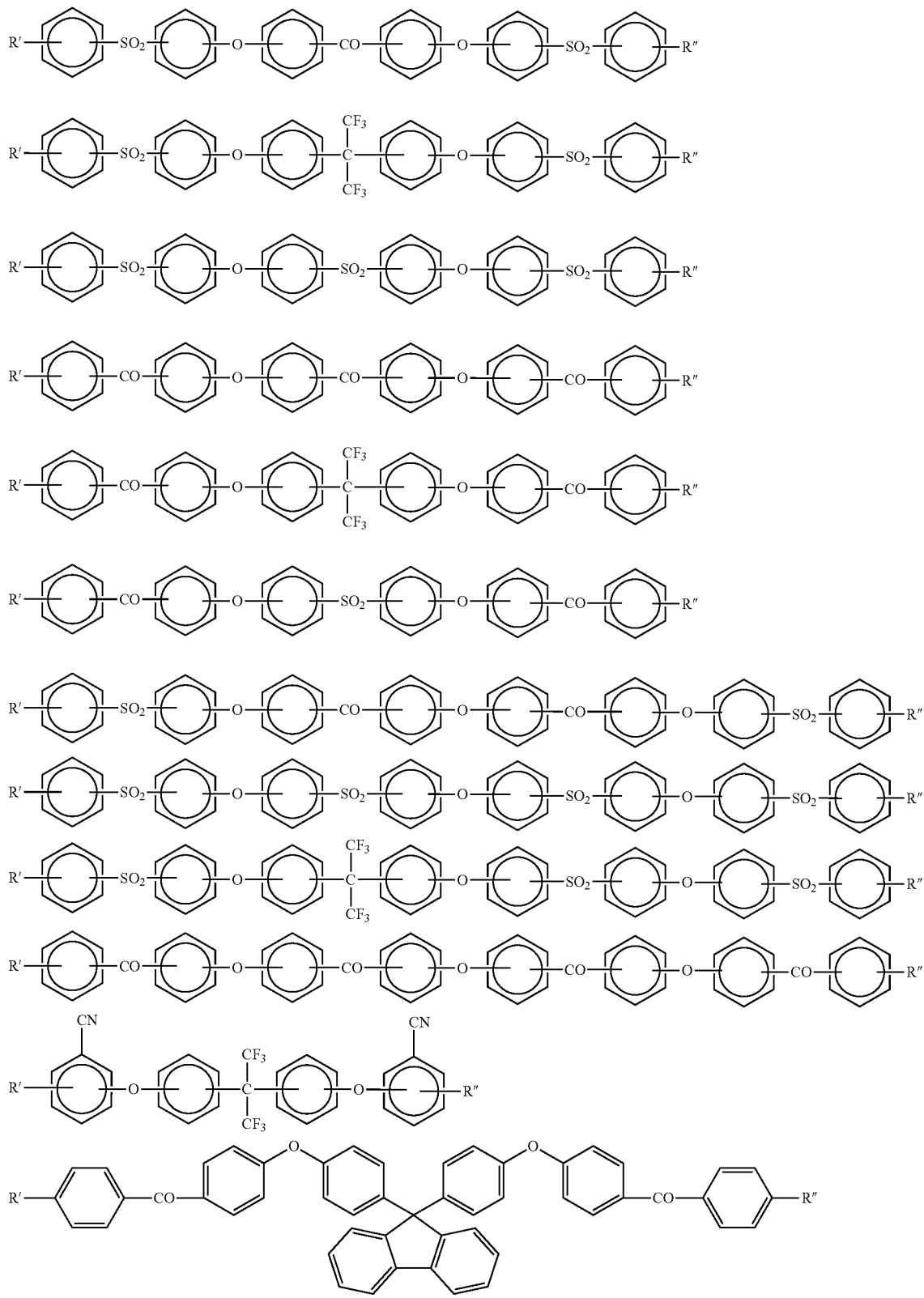

When r is 2 or more in general formula (B'), compounds having the following structure may be included.
(Formula 18)
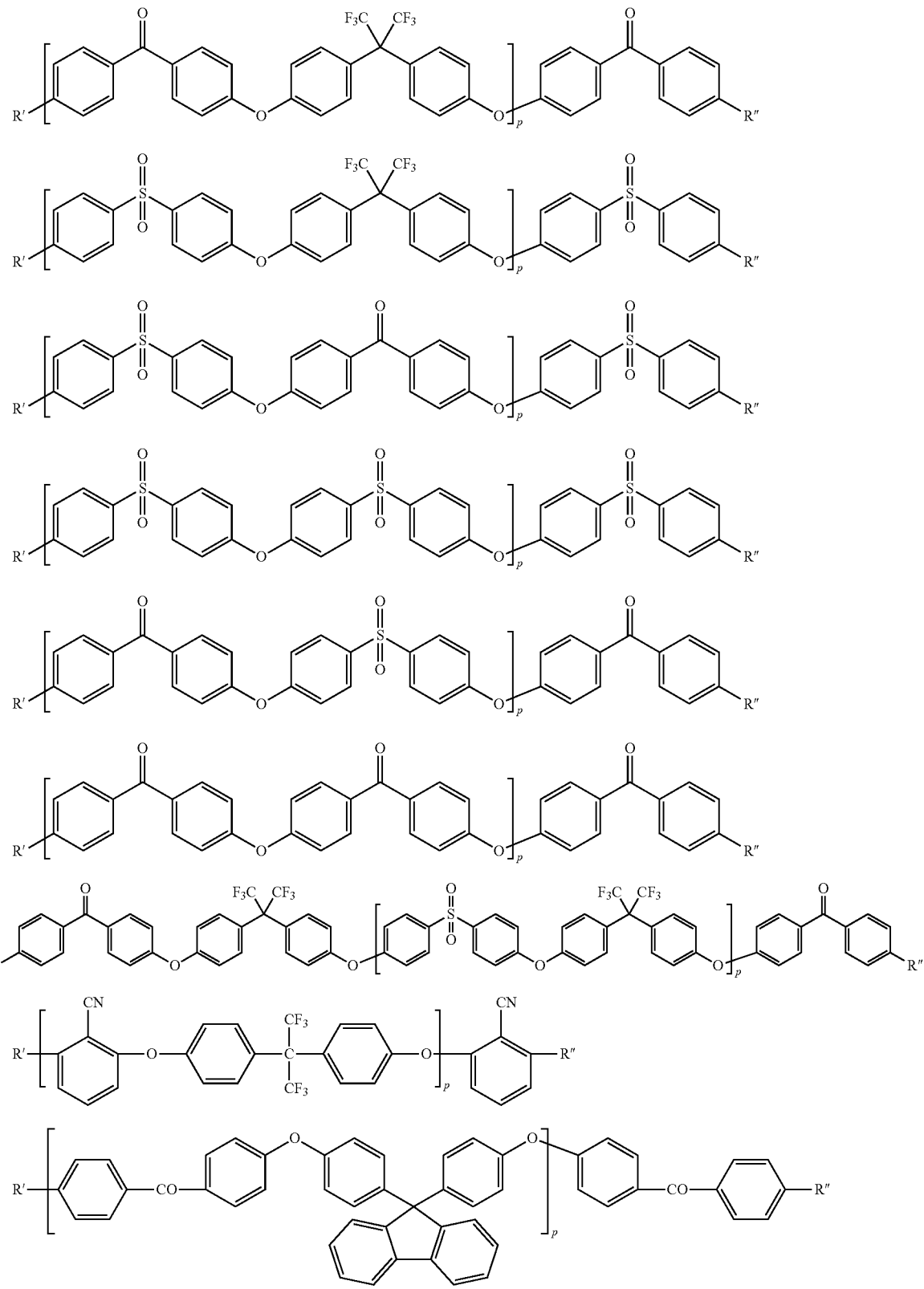

Monomer (C')
(Formula 19)
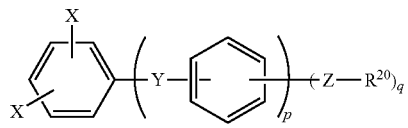
X represents an atom or group selected from a chlorine atom, a bromine atom or —OSO$_2$R$_b$ (R$_b$ herein represents alkyl, fluoro-substituted alkyl or aryl).
Y, Z, R$^{20}$, p and q are the same as those in general formula (C).
Specific examples of monomer (C') include the following compounds.
(Formula 20)
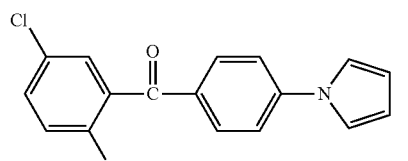
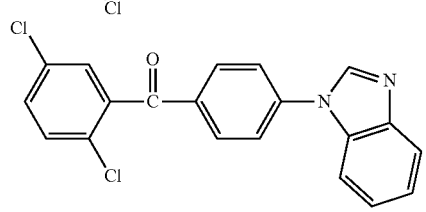
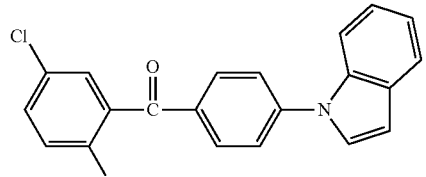
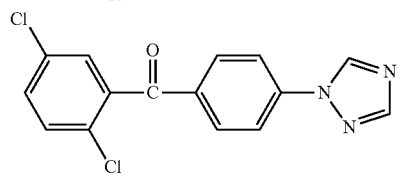
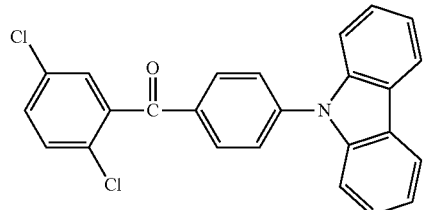
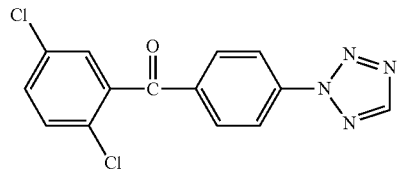
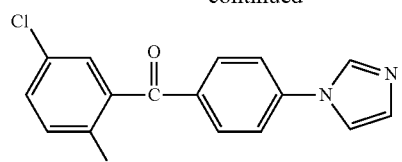
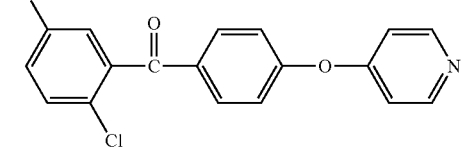
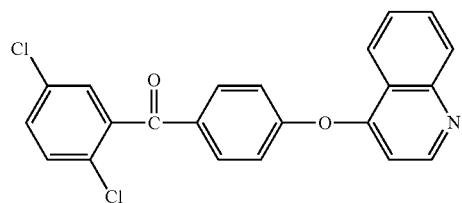
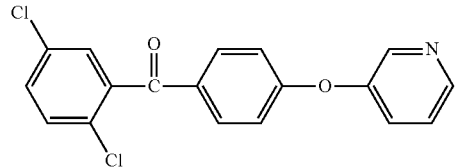
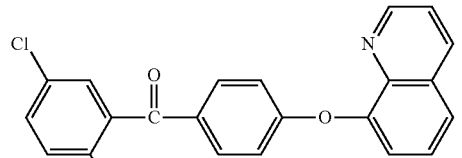
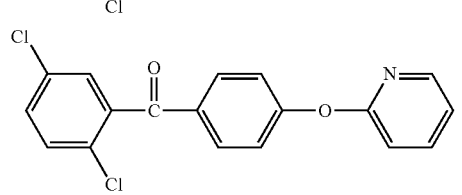
(Formula 21)
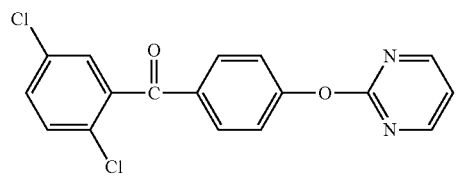
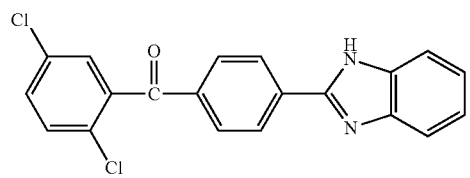
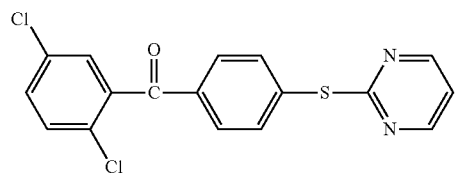

-continued

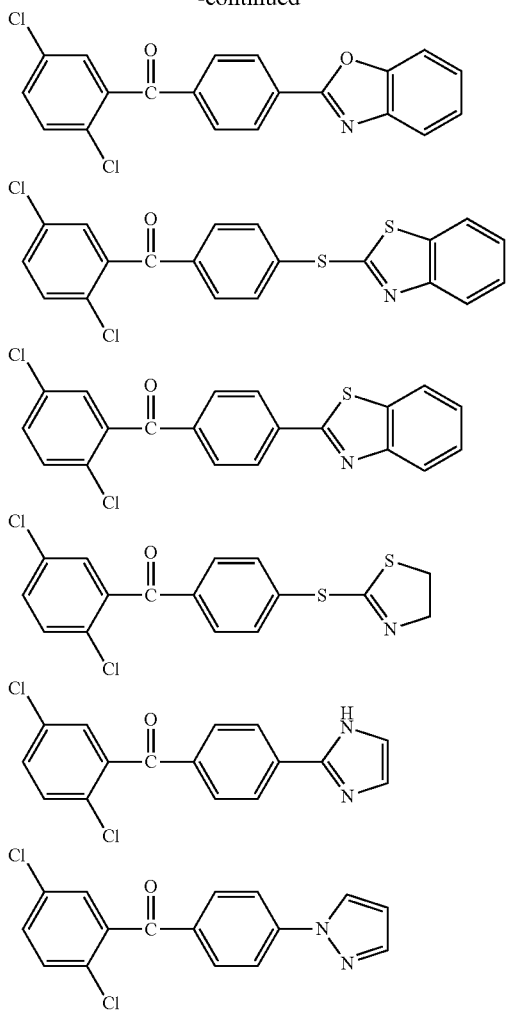

The compounds in which a chlorine atom is replaced with a bromine atom and the isomers in which a chlorine atom or bromine atom is bonded at different positions may be further included. The compounds in which a —CO— bond is replaced with an —SO₂— bond may also be included. These compounds may be used singly or in a combination of two kinds or more.

A method to synthesize monomer (C') includes, for example, nucleophilic substitution reaction between the compound represented by the following general formula (2) and the nitrogen-containing heterocyclic compound.

(Formula 22)

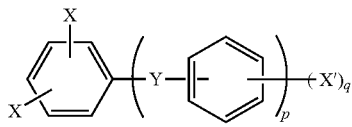

(2)

In the formula, X, Y, p and q are similar to those represented in general formula (C'). X' represents a halogen atom. A fluorine or chlorine atom is preferred and a fluorine atom is more preferred.

Specific examples of the compounds represented by general formula (2) include 2,4-dichloro-4'-fluorobenzophenone, 2,5-dichloro-4'-fluorobenzophenone, 2,6-dichloro-4'-fluorobenzophenone, 2,4-dichloro-2'-fluorobenzophenone, 2,5-dichloro-2'-fluorobenzophenone, 2,6-dichloro-2'-fluorobenzophenone, 2,4-dichlorophenyl-4'-fluorophenyl sulfone, 2,5-dichlorophenyl-4'-fluorophenyl sulfone, 2,6-dichlorophenyl-4'-fluorophenyl sulfone and 2,4-dichlorophenyl-2'-fluorophenyl sulfone.

Among these compounds, 2,5-dichloro-4'-fluorobenzophenone is preferred.

The nitrogen-containing heterocyclic compound has an active hydrogen, which is subjected to substitution reaction with X' in the compound represented by general formula (2).

The nitrogen-containing heterocyclic compound having the active hydrogen includes pyrrole, thiazole, isothiazole, oxazole, isoxazole, pyridine, imidazole, imidazoline, pyrazole, 1,3,5-triazine, pyrimidine, pyridazine, pyrazine, indole, quinoline, isoquinoline, purine, benzimidazole, benzoxazole, benzothiazole, tetrazole, tetrazine, triazole, carbazole, acridine, quinoxaline, quinazoline, 2-hydroxypyridine, 3-hydroxypyridine, 4-hydroxypyridine, 3-hydroxyquinoline, 8-hydroxyquinoline, 2-hydroxypyrimidine, 2-mercaptopyridine, 3-mercaptopyridine, 4-mercaptopyridine, 2-mercaptopyrimidine, 2-mercaptobenzothiazole and the like.

Among these compounds, pyrrole, imidazole, indole, carbazole, benzoxazole and benzimidazole are preferred.

The reaction of the compound represented by the general formula (2) with the nitrogen-containing heterocyclic compound having an active hydrogen is preferably carried out in an organic solvent. A polar solvent such as N-methyl-2-pyrrolidone, N,N-dimethylacetamide, sulforane, diphenyl sulfone, dimethylsulfoxide and the like are used as the solvent. Alkali metals, alkali metal hydrides, alkali metal hydroxides, alkali metal carbonates and the like are used to promote the reaction. The ratio of the compound represented by the general formula (2) to the nitrogen-containing heterocyclic compound having an active hydrogen used in the reaction is equimolar or in excess with the nitrogen-containing heterocyclic compound having an active hydrogen. Specifically, the nitrogen-containing heterocyclic compound having an active hydrogen is used preferably 1 to 3 mol, particularly 1 to 1.5 mol to one mol of the compound represented by the general formula (2).

The reaction temperature is 0° C. to 300° C., preferably 10° C. to 200° C. The reaction time is 15 minutes to 100 hours, preferably 1 hour to 24 hours.

The products are preferably purified by a method such as recrystallization and the like before use.

Polymerization

The monomer (A'), monomer (C') and monomer (B') if necessary are at first copolymerized to yield a precursor in order to obtain the above polymer.

The copolymerization is carried out in the presence of a catalyst and the catalyst used herein is a catalyst system containing a transition metal compound. The catalyst system contains as essential components (1) a transition metal salt and a compound to serve as a ligand (referred to as "ligand component" hereinafter) or a transition metal complex coordinated with a ligand (including copper salt) and (2) a reducing agent and a "salt" may be further added in order to increase the polymerization rate.

Specific examples of such catalyst components, a usage ratio of each component and polymerization conditions such as reaction solvent, concentration, temperature, time and the like used may be the compounds and conditions disclosed in Japanese Patent Laid-Open Publication No. 2001-342241.

For example, nickel chloride, nickel bromide and the like are preferably used as a transition metal salt and triphenylphosphine, tri-o-tolylphosphine, tri-m-tolylphosphine, tri-p-tolylphosphine, tributylphosphine, tri-tert-butylphosphine, trioctylphosphine, 2,2-bipyridine and the like are preferably used as the compound to serve as the ligand. Furthermore, bis(triphenylphosphine) nickel chloride and (2,2'-bipyridine)nickel chloride are suitably used as a transition metal (salt) preliminarily coordinated with a ligand. Reducing agents include, for example, iron, zinc, manganese, aluminum, magnesium, sodium, calcium and the like, and zinc, magnesium and manganese are preferred. Sodium bromide, sodium iodide, potassium bromide, tetraethylammonium bromide and tetraethylammonium iodide are preferred as a "salt". A polymerization solvent may be used for the reaction and specifically tetrahydrofuran, N,N-dimethylformamide, N,N-dimethylacetamide, 1-methyl-2-pyrrolidone and the like are suitably used.

The usage ratio of each component in the catalyst system is generally 0.0001 to 10 mol, preferably 0.01 to 0.5 mol of a transition metal salt or transition metal (salt) coordinated with a ligand relative to 1 mol of a monomer in total. Catalyst activity is high within this range, allowing to yield a polymer with a high molecular weight. When a "salt" is used in the catalyst system, the usage ratio thereof is generally 0.001 to 100 mol, preferably 0.01 to 1 mol relative to 1 mol of a monomer in total. The polymerization rate is effectively increased in this range. The concentration of the monomer in total in a polymerization solvent is generally 1 to 90% by weight, preferably 5 to 40% by weight. The polymerization temperature to form a polymer is generally 0 to 200° C., preferably 50 to 100° C. The polymerization time is also generally 0.5 to 100 hours, preferably 1 to 40 hours.

The polymer obtained is next hydrolyzed to convert the sulfonate ester group ($-SO_3R$) in the structural unit to the sulfonic acid group ($-SO_3H$).

Hydrolysis may be carried out, for example, by a method in which (1) the above polymer having the sulfonate ester group is poured into an excess amount of water or alcohol containing a small amount of hydrochloric acid and the resulting mixture is for 5 minutes or longer; (2) the above polymer having the sulfonate ester group is reacted in trifluoroacetic acid in a temperature range of 80 to 120° C. for about 5 to about 10 hours; (3) the above polymer having the sulfonate ester group is reacted in a solution, for example, a solution of N-methylpyrrolidone and the like containing lithium bromide in the amount of one to three mol relative to one mol of the sulfonate ester group ($-SO_3R$) in the polymer in a temperature range of 80 to 150° C. for 3 to 10 hours, followed by addition of hydrochloric acid; and others.

(Method B)

For example, as similar to a method disclosed in Japanese Patent Laid-Open Publication No. 2001-342241, a polymer may be synthesized by copolymerizing a monomer having a skeleton represented by above general formula (A') but lacking the sulfonic acid group or sulfonate ester group, the above monomer (B') and above monomer (C') to yield a polymer, which is sulfonated with a sulfonating agent.

Specific examples of monomers useful in Method B and not having the sulfonic acid group or sulfonate ester group serving as a structural unit represented by the above general formula (A) include dihalides disclosed in Japanese Patent Laid-Open Publication No. 2001-342241 and Japanese Patent Laid-Open Publication No. 2002-293889.

(Method C)

When Ar in general formula (A) is an aromatic group having a substituent represented by $-O(CH_2)_nSO_3H$, $-O(CF_2)_nSO_3H$, for example, as similar to the method disclosed in Japanese Patent Laid-Open Publication No. 2005-606254, a polymer may be synthesized by a method in which a monomer of a precursor serving as a structural unit represented by the above general formula (A), a monomer or oligomer serving as a structural unit represented by above general formula (B) and a monomer serving as a structural unit represented by above general formula (C) are copolymerized, followed by introducing an alkylsulfonic acid or fluoro-substituted alkylsulfonic acid.

Specific examples of a precursor monomer useful in Method C and serving as a structural unit represented by the above general formula (A) include dihalides disclosed in Japanese Patent Laid-Open Publication No. 2005-36125. Specifically included are 2,5-dichloro-4'-hydroxybenzophenone, 2,4-dichloro-4'-hydroxybenzophenone, 2,6-dichloro-4'-hydroxybenzophenone, 2,5-dichloro-2',4'-dihydroxybenzophenone and 2,4-dichloro-2',4'-dihydroxybenzophenone. Compounds in which the hydroxyl group of the compounds thereof is protected by tetrahydropyranyl group and the like may also be included. Compounds in which the hydroxyl group is replaced with the thiol group or those in which chlorine atom is replaced with a bromine or iodine atom may also be included.

An electrode electrolyte related to the present invention suffices to contain the above polymer, so that it may contain only the above polymer or additionally other electrolytes. The other electrolytes include perfluorocarbon polymers used conventionally and represented by Nafion, Flemion and Aciplex, sulfonated products of vinyl polymers such as polystyrenesulfonic acid and the like and organic polymers in which a sulfonic acid group or phosphoric acid group is introduced into a high heat-resistant polymer such as polybenzimidazole, polyetherether ketone and the like. When the other electrolytes are contained, the usage ratio thereof is preferably 50% by weight or less, more suitably 30% by weight or less relative to a whole electrode electrolyte.

(Electrode Paste)

The electrode paste of the present invention is composed of the above electrode electrolyte, catalyst particles and a solvent and may contain other components such as dispersants, carbon fibers and the like if necessary.

Catalyst Particles

The catalyst particles are composed of a catalyst supported on a carrier such as carbon or metal oxides or a neat catalyst. Such catalyst particles function as an electrode catalyst.

Platinum or a platinum alloy is used as the catalyst. Use of platinum or a platinum alloy may contribute to the further enhancement of stability and activity as an electrode catalyst. Such a platinum alloy used is preferably an alloy of a metal selected from one kind or more of a metal in a platinum metal group other than platinum (ruthenium, rhodium, palladium, osmium and iridium), iron, cobalt, titanium, gold, silver, chromium, manganese, molybdenum, tungsten, aluminum, silicon, rhenium, zinc and tin with platinum and the platinum alloy may contain an intermetallic compound with a metal, which is alloyed with platinum.

The catalyst is in a form of catalyst particles in a neat state or in a supported state on a carrier. Carbon black such as oil furnace black, channel black, lamp black, thermal black, acetylene black and the like are preferably used as the carrier to support the above catalyst because of high electron conductivity and high specific surface area. Natural graphite, artificial graphite obtained from organic compounds such as pitch, cokes, polyacrylonitrile, phenol resins, furan resins and the like, carbon and the like may be used.

The above oil furnace black includes "Valcan XC-72", "Valcan P", "Black Pearls 880", "Black Pearls 1100", "Black Pearls 1300", "Black Pearls 2000" and "REGAL 400" manufactured by Cabot Corporation, "Ketjen Black EC" manufactured by Lion Corporation, "#3150 and #3250" manufactured by Mitsubishi Chemical Corporation and the like. Also, the above acetylene black includes "Denka Black" manufactured by Denki Kagaku Kogyo Co., Ltd. and the like.

Such carbons may be used in the form of particles or fibers. The amount of the catalyst supported on carbon is not particularly limited so long as the catalyst activity is exhibited, but the supported amount is in a range of 0.1 to 9.0 g-metal/g-carbon, preferably 0.25 to 2.4 g-metal/g-carbon relative to the weight of carbon.

Also, the carrier may include, in addition to carbon, metal oxides, for example, titania, zinc oxide, silica, ceria, alumina, alumina spinel, magnesia, zirconia and the like.

Solvent

The solvent for the electrode paste of the present invention is not particularly limited so long as it may dissolve or disperse the above electrolyte. Not only one kind but also two kinds or more of the solvents may be used.

Specifically, it includes water, alcohols such as methanol, ethanol, n-propanol, 2-propanol, 2-methyl-2-propanol, 2-butanol, n-butanol, 2-methyl-1-propanol, 1-pentanol, 2-pentanol, 3-pentanol, 2-methyl-1-butanol, 3-methyl-1-butanol, 2-methyl-2-butanol, 3-methyl-2-butanol, 2,2-dimethyl-1-propanol, cyclohexanol, 1-hexanol, 2-methyl-1-pentanol, 2-methyl-2-pentanol, 4-methyl-2-pentanol, 2-ethyl-1-butanol, 1-methylcyclohexanol, 2-methylcyclohexanol, 3-methylcyclohexanol, 4-methylcyclohexanol, 1-octanol, 2-octanol, 2-ethyl-1-hexanol, 2-methoxyethanol, 2-ethoxyethanol, 2-(methoxymethoxy)ethanol, 2-isopropoxyethanol, 1-methoxy-2-propanol, 1-ethoxy-2-propanol and the like, polyols such as ethylene glycol, propylene glycol, glycerol and the like, ethers such as dioxane, tetrahydrofuran, tetrahydropyran, diethyl ether, diisopropyl ether, di-n-propyl ether, butyl ether, phenyl ether, isopentyl ether, 1,2-dimethoxyethane, diethoxyethane, bis(2-methoxyethyl)ether, bis(2-ethoxyethyl) ether, cineole, benzyl ethyl ether, anisole, phenetole, acetal and the like, ketones such as acetone, methyl ethyl ketone, 2-pentanone, 3-pentanone, cyclopentanone, cyclohexanone, 2-hexanone, 4-methyl-2-pentanone, 2-heptanone, 2,4-dimethyl-3-pentanone, 2-octanone and the like, esters such as γ-butyrolactone, ethyl acetate, propyl acetate, n-butyl acetate, isobutyl acetate, sec-butyl acetate, pentyl acetate, isopentyl acetate, 3-methoxybutyl acetate, methyl butyrate, ethyl butyrate, methyl lactate, ethyl lactate, butyl lactate and the like, aprotic polar solvents such as dimethylsulfoxide, N-methylformamide, N,N-dimethylformamide, N,N-diethylformamide, N,N-dimethylacetamide, N-methyl-2-pyrroridone, teteramethylurea and the like and hydrocarbon solvents such as toluene, xylene, hexane, heptane, octane and the like and these may be used singly or in a combination of two kinds or more.

Dispersant

The dispersant, which may be contained if necessary includes anionic surfactants such as oleic acid/N-methyltaurine, potassium oleate/diethanolamine salt, alkyl ether sulfate/triethanolamine salt, polyoxyethylene alkyl ether sulfate/triethanolamine salt, amine salt of specially modified polyetherester acid, amine salt of higher fatty acid derivative, amine salt of specially modified polyester acid, amine salt of high molecular weight polyetherester acid, amine salt of specially modified phosphate ester, amine salt of high molecular weight polyester amide, amine salt of amide of special fatty acid derivatives, alkylamine salt of higher fatty acids, amine salt of high molecular weight polycarboxylic acid amide, sodium laurate, sodium stearate, sodium oleate, sodium lauryl sulfate, sodium cetyl sulfate, sodium stearyl sulfate, sodium oleyl sulfate, a salt of lauryl ether sulfate ester, sodium alkylbenzenesulfonate, oil soluble alkylbenzenesulfonate, α-olefinesulfonate, disodium salt of fatty alcohol monophosphate, disodium salt of fatty alcohol diphosphate, zinc dialkyldithiophosphate and the like, cationic surfactants such as benzyldimethyl{2-[2-(P-1,1,3,3-tetramethylbutylphenoxy)ethoxy]ethyl}ammonium chloride, octadecylamine acetate, tetradecylamine acetate, octadecyltrimethylammonium chloride, beef tallow trimethylammonium chloride, dodecyltrimethylammonium chloride, coconut trimethylammonium chloride, hexadecyltrimethylammonium chloride, behenyltrimethylammonium chloride, coconut dimethylbenzylammonium chloride, tetradecyldimethylbenzylammonium chloride, octadecyldimethylbenzylammonium chloride, dioleyldimethylammonium chloride, 1-hydroxyethyl-2-beef tallow imidazoline quaternary salt, 2-heptadecenylhydroxyethylimidazoline, stearamide ethyldiethylamine acetate, stearamide ethyldiethylamine hydrochloride, triethanolamine monostearate formate, alkylpyridium salt, higher alkylamine-ethylene oxide adduct, polyacrylamide amine salt, modified polyacrylamide amine salt, perfluoroalkyl quaternary ammonium iodide and the like, amphoteric surfactants such as coconut-dimethyl betaine, lauryl dimethyl betaine, sodium laurylaminoethylglycine, sodium laurylaminopropionate, stearyl dimethyl betaine, lauryl dihydroxyethyl betaine, amide betaine, imidazolium betaine, lecithin, sodium 3-[ω-fluoroalkanoyl-N-ethylamino]-1-propanesulfonate, N-[3-(perfluorooctanesulfonamide)propyl]-N,N-dimethyl-N-carboxymethyleneammonium betaine and the like, and nonionic surfactants such as coconut fatty acid diethanolamide (1:2 type), coconut fatty acid diethanolamide (1:1 type), beef tallowate acid diethanolamide (1:2 type), beef tallowate acid diethanolamide (1:1 type), oleic acid diethanolamide (1:1 type), hydroxyethyllaurylamine, polyethylene glycol laurylamine, polyethylene glycol coconut amine, polyethylene glycol stearylamine, polyethylene glycol beef tallow amine, polyethylene glycol beef tallow propylenediamine, polyethylene glycol dioleylamine, dimethyllaurylamine oxide, dimethylstearylamine oxide, dihydroxyethyllaurylamine oxide, perfluoroalkylamine oxide, polyvinyl pyrrolidone, higher alcohol-ethylene oxide adduct, alkyl phenol-ethylene oxide adduct, fatty acid-ethylene oxide adduct, polypropylene glycol-ethylene oxide adduct, fatty acid ester of glycerol, fatty acid ester of pentaerythritol, fatty acid ester of sorbit, fatty acid ester of sorbitan, fatty acid ester of sugar and the like, and amphoteric surfactants such as sodium laurylaminopropionate, stearyl dimethyl betaine, lauryl dihydroxyethyl betaine and the like. These may be used singly or in a combination of two kinds or more. Among them, surfactants having a basic group are preferred and anionic or cationic surfactants are more preferred and surfactants with a molecular weight of 5,000 to 30,000 are further more preferred.

Addition of the above dispersant to the electrode paste improves storage stability and flowability, thus improving productivity in coating.

Carbon Fibers

Carbon fibers, on which a catalyst is not supported may be added if necessary to the electrode paste related to the present invention.

The carbon fibers used if necessary in the present invention include rayon carbon fibers, PAN type carbon fibers, lignin poval-type carbon fibers, pitch-type carbon fibers, carbon fibers grown in vapor phase and the like, but carbon fibers grown in vapor phase are preferred.

Addition of carbon fibers to the electrode paste increases a pore volume in the electrode, improving diffusion of a fuel gas and an oxygen gas and modifying flooding due to water generated and the like to improve performance of power generation.

Other Additives

Other components may be further added to an electrode paste related to the present invention if necessary. For example, a water repellent such as a fluoro polymer or silicone polymer may be added. A water repellent has an effect to effectively eject water formed to contribute to improving performance in power generation.

Composition

The usage ratio of catalyst particles in the paste related to the present invention is 1% to 20% by weight, preferably 3% to 15% by weight in terms of the weight ratio. Also, the usage ratio of an electrode electrolyte is 0.5 to 30% by weight, preferably 1% to 15% by weight in terms of weight ratio. Further, the usage ratio of a solvent is 5% to 95% by weight, preferably 15% to 30% by weight in terms of the weight ratio.

The usage ratio of the dispersant used if necessary is 0% to 10% by weight, preferably 0% to 2% by weight in terms of the weight ratio and the usage ratio of carbon fibers used if necessary is 0% to 20% by weight, preferably 1% to 10% by weight in terms of the weight ratio. (A total never exceeds 100% by weight.)

When the usage ratio of catalyst particles is below the above range, electrode reactivity may be reduced. When the usage ratio is beyond the above range, the viscosity of the electrode paste is increased possibly causing uneven coating during coating.

When the usage ratio of the electrolyte is below the above range, proton conductivity is reduced. Furthermore, it cannot function as a binder, failing to form an electrode. Also, when the usage ratio is beyond the above range, a pore volume in the electrode is decreased.

When the usage ratio of the solvent is within the above range, the pore volume in the electrode required to generate power is sufficiently secured. Also, when the usage ratio is within the above range, the paste is suitable for handling.

When the usage ratio of the dispersant is within the above range, the electrode paste excellent in storage stability may be obtained. When the usage ratio of carbon fibers is below the above range, the effect of increasing the pore volume in an electrode is small. When the usage ratio is beyond the above range, electrode reactivity may be reduced.

Preparation of Paste

The electrode paste related to the present invention may be prepared, for example, by blending each component mentioned above in a predetermined proportion and then kneading according to a conventionally known method.

The order of blending of each component is not particularly limited and, for example, it is preferred that all components are blended and the resulting mixture was stirred for a certain period of time or components other than the dispersant are blended and the resulting mixture was stirred for a certain period of time, to which a dispersant is then added if necessary to stir for a certain period of time. The volume of the solvent may also be controlled as needed to adjust the viscosity of the paste.

Electrode and Catalyst-loaded Electrolyte Membrane

The electrode paste related to the present invention as described above is applied to a transfer substrate, from which the solvent is removed to yield the electrode of the present invention.

A transfer substrate used may include a sheet composed of a fluoropolymer such as polytetrafluoroethylene (PTFE), a glass plate or metal plate in which a surface is treated with a release agent, a sheet such as polyethylene terephthalate (PET) and the like.

A coating method includes brush coating, writing brush coating, bar coater coating, knife coater coating, doctor blade coating, screen printing, spray coating and the like. The electrode coated on a transfer substrate is dried to remove the solvent and then transferred onto both sides of a solid polymer electrolyte membrane, yielding the catalyst-loaded electrolyte membrane of the present invention.

The solid polymer electrolyte membrane used as the catalyst-loaded electrolyte membrane of the present invention is not particularly limited so long as it is a proton-conductive solid polymer membrane. For example, it includes an electrolyte membrane composed of a perfluoroalkylsulfonic acid polymer such as Nafion (manufactured by Dupont, Ltd.), Flemion (manufactured by Asahi Glass Co., Ltd.) and Aciplex (manufactured by Asahi Chemical Co. Ltd.), a reinforced-type electrolyte membrane formed as a composite of the perfluoroalkylsulfonic acid polymer with electrolyte membrane composed of a partially fluorinated sulfonated polymer such as polytetrafluoroethylene-grafted sulfonated polystyrene and the like, an electrolyte membrane composed of an aromatic sulfonated polymer such as sulfonated polyarylene, sulfonated polyphenylene, sulfonated polyether ketone, sulfonated polyethersulfone, sulfonated polyether nitrile, sulfonated polyphenylene ether, sulfonated polyphenylene sulfide, sulfonated polybenzimidazole, sulfonated polybenzoxazole, sulfonated polybenzothiazole and the like, an electrolyte membrane composed of sulfonated polystyrene or an aliphatic sulfonated polymer such as sulfonic acid-containing acrylic polymer, a pore filling-type electrolyte membrane formed as a composite of these polymers with a porous membrane, an electrolyte membrane composed of acid impregnated-type polymer such as polybenzoxazole, polybenzimidazole, polybenzothiazole and the like impregnated with phosphoric acid, sulfuric acid and the like. Among them, an electrolyte membrane composed of an aromatic sulfonated polymer is preferred.

The polymer constituting the above electrolyte for the electrode may also be used as a solid polymer electrolyte membrane. A hot press method may be used to transfer an electrode onto a solid polymer electrolyte membrane. The hot press method is a method in which an electrode paste-coated surface of carbon paper or a release sheet, to which the above electrode paste is applied, is pressed against an electrolyte membrane. The hot pressing is generally carried out in a temperature range of 50 to 250° C. and a pressure of 10 to 500 kg/cm$^2$ for a time of 1 to 180 minutes.

Another method to obtain the catalyst-loaded electrolyte membrane of the present invention includes a method to repeat stepwise application and drying of a catalyst layer and an electrolyte membrane. The order of application and drying is not particularly limited.

For example, a solution for an electrolyte membrane is applied on a substrate such as PET films and the like and dried to form an electrolyte membrane, and the electrode paste of the present invention is then applied thereon. The substrate is then peeled and an electrode paste is applied to the other surface. The solvent is finally removed to yield a catalyst-loaded electrolyte membrane. A coating method may include similar methods described above.

The solvent is removed at a drying temperature of 20° C. to 180° C., preferably 50° C. to 160° C. for a drying time of 5 minutes to 600 minutes, preferably 30 minutes to 400 minutes. The electrolyte membrane may be immersed in water to remove the solvent if necessary. The water temperature is 5° C. to 120° C., preferably 15° C. to 95° C. and the water immersion time is 1 minute to 72 hours, preferably 5 minutes to 48 hours.

Contrary to the above method, an electrode paste is first applied to a substrate to form an electrode layer, and a solution for an electrolyte membrane is then applied thereon to form an electrolyte membrane. Then coating is applied on the other catalyst layer, and the coating is dried to yield a catalyst-loaded electrolyte membrane.

The thickness of an electrode layer is not particularly limited, but a supported metal as a catalyst per unit area is desired to be in a range of 0.05 to 4.0 mg/cm$^2$, preferably 0.1 to 2.0 mg/cm$^2$. This range allows for sufficiently achieving high catalyst activity and effectively conducting protons.

The pore volume of the electrode layer is desired to be in a range of 0.05 to 3.0 ml/g, preferably 0.1 to 2.0 ml/g. The pore volume of the electrode layer is measured by a method such as a mercury penetration method, a gas adsorption method and the like.

The thickness of the electrolyte membrane is not particularly limited and preferably in a range of 10 to 200 μm because a too thick membrane lowers efficiency of power generation or makes weight reduction difficult, but this range should not be regarded as limitation.

Example

The present invention is next described below in detail based on examples, but not limited by these examples. Various items of measurement in examples were determined as follows.
(Molecular Weight)

The molecular weight of a polymer was determined by GPC as a weight average molecular weight relative to polystyrene standards. N-methyl-2-pyrrolidone added with lithium bromide was used as a solvent.
(Ion Exchange Capacity)

After the sulfonated polymer obtained was thoroughly washed until the pH of washing water reached 4 to 6 to remove residual free acids and dried, a predetermined amount of the polymer was weighed and dissolved in a mixed solvent of THF/water and titrated with a standard solution of NaOH using phenolphthalein as an indicator to determine a neutralization point, from which an ion exchange capacity was obtained.
(Measurement of Resistivity)

The polymer obtained was formed into a film using a casting method and a membrane with thickness of about 50 μm was used as a sample.

An alternating current resistance was measured by pressing a platinum wire (f=0.5 mm) on a surface of a rectangular sample membrane 5 mm wide, which was kept in a constant temperature and humidity apparatus to determine an alternate current impedance between the platinum wires. That is, impedance under the environment of 85° C. and relative humidity of 90% was measured at an alternate current of 10 kHz. A chemical impedance measurement system manufactured by NF Corporation was used as a resistance measurement instrument and JW241 manufactured by Yamato Scientific Co., Ltd. was used as a constant temperature and humidity apparatus. Five platinum wires were pressed at an interval of 5 mm and a distance between wires were varied between 5 and 20 mm to measure the alternate current resistance. The resistivity of a membrane was calculated from a gradient in a relation of the distance between wires and the resistance.

Resistivity $R(\Omega\cdot cm)=0.5$ (cm)×membrane thickness (cm)×gradient in resistance vs. wire distance ($\Omega$/cm)

Synthesis Example 1

Synthesis of 2,5-dichloro-4'-(1-imidazolyl)benzophenone (Formula 23)

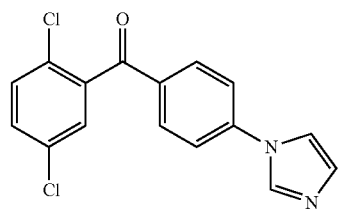

A charge of 150.7 g (0.560 mol) of 2,5-dichloro-4'-fluorobenzophenone, 114.4 g (1.68 mol) of imidazole, 100.6 g (0.728 mol) of potassium carbonate and 840 mL of N,N'-dimethylacetamide was weighed into a 2-L three-neck flask equipped with a stirrer, a thermometer, a cooling tube and a nitrogen gas introducing tube. The reaction solution was heated under nitrogen atmosphere to 110° C. for 2 hours using an oil bath. After the disappearance of raw materials was confirmed by thin layer chromatography, the reaction solution was left to cool to room temperature. The reaction solution was then gradually added to 3 L of water to coagulate a product, which was filtered. The product obtained by filtration was dissolved in THF (1.2 L), to which toluene (4 L) was added, followed by washing with brine until an aqueous layer became neutral. After the organic layer was dried over magnesium sulfate, the solvent was removed by an evaporator. A crude yield was 180 g.

A mixed solvent of 1 L of toluene and 20 ml of methanol heated to 80° C. was used for recrystallization to yield 155 g of a solid in white color in 87% yield. $^1$H-NMR spectrum of the compound obtained is shown in FIG. 1.

Synthesis Example 2

Synthesis of 2,5-dichloro-4'-(1-pyrrolyl)benzophenone (Formula 24)

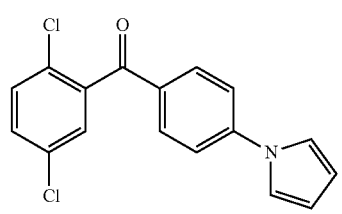

A charge of 134.6 g (0.500 mol) of 2,5-dichloro-4'-fluorobenzophenone, 50.3 g (0.750 mol) of pyrrole, 76.0 g (0.550 mol) of potassium carbonate and 840 mL of dehydrated N,N'- dimethylacetamide was weighed into a 2-L three-neck flask equipped with a stirrer, a thermometer, a cooling tube and a nitrogen gas introducing tube. The reaction solution was heated under nitrogen atmosphere to 100° C. for 3 hours using an oil bath. After the disappearance of raw materials was confirmed by thin layer chromatography, the reaction solution was left to cool to room temperature. The reaction solution was then gradually added to 3 L of water to coagulate a product, which was filtered. The product obtained by filtration was dissolved in 2.5 L of toluene, which was washed with brine using a separating funnel until an aqueous layer became neutral. After the organic layer was dried over magnesium sulfate, the solvent was removed by an evaporator. A crude yield was 133.3 g. A mixed solvent of hexane and ethyl acetate was used for recrystallization to yield 125.3 g (0.396 mol) of a purified product targeted in 79.3% yield.

Synthesis Example 3

Synthesis of 2,5-dichloro-4'-(2-benzothiazolethioxy) benzophenone (Formula 25)

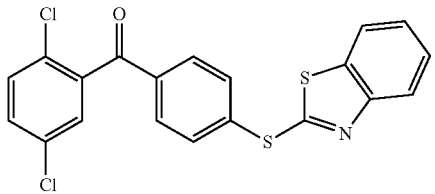

A charge of 269.1 g (1.00 mol) of 2,5-dichloro-4'-fluorobenzophenone, 175.6 g (1.05 mol) of 2-benzothiazolethiol, 152.0 g (1.10 mol) of potassium carbonate and 1.5 L of dehydrated N,N'-dimethylacetamide was weighed into a 3 L three-neck flask equipped with a stirrer, a thermometer, a cooling tube and a nitrogen gas introducing tube. The reaction solution was heated under nitrogen atmosphere to 110° C. for 2 hours using an oil bath. After the disappearance of raw materials was confirmed by thin layer chromatography, the reaction solution was left to cool to room temperature. The reaction solution was then gradually added to 3 L of water to coagulate a product, which was filtered. The product obtained by filtration was dissolved in 4 L of toluene. The organic layer was washed with brine until an aqueous layer became neutral. After the organic layer was dried over magnesium sulfate, the solvent was removed by an evaporator. A crude yield was 350.3 g. A 1.5 L aliquot of toluene heated to 80° C. was used for recrystallization to yield 325.4 g (0.782 mol) of a purified product in 78.2% yield.

Polymerization Example 1

(1) Synthesis of Sulfonated Polymer Containing Nitrogen-Containing Heterocyclic Group A-N1

Into a three-neck flask equipped with a cooling tube and a three-way cock were charged 185.3 g (540 mmol) of 2,5-dichloro-4'-phenoxybenzophenone, 15.1 g (60 mmol) of 4,4'-dichlorobenzophenone, 7.1 g (24 mmol) of 2,5-dichloro-4'-(1-pyrrolyl)benzophenone obtained in Synthesis Example 2, 11.7 g (78 mmol) of sodium iodide, 11.8 g (18 mmol) of bis(triphenylphosphine) nickel dichloride, 63.0 g (240 mmol) of triphenylphosphine and 94.1 g (1.44 mol) of zinc, then the flask was immersed in an oil bath at 70° C. and the atmosphere was replaced with nitrogen gas, to which 1,000 mL of N-methyl-2-pyrrolidone was added under nitrogen atmosphere to initiate the reaction. After reacting for 20 hours, a reaction mixture was diluted with 500 mL of N-methyl-2-pyrrolidone and the polymerization reaction solution was then poured into a 1:10 hydrochloric acid/methanol solution to precipitate a polymer, which was washed, filtered and dried under vacuum to yield a powder in white color. The yield was 148 g. And the weight average molecular weight was 154,000. A 1500 mL aliquot of concentrated sulfuric acid was added to 150 g of this polymer, and the mixture was stirred at room temperature for 24 hours for sulfonation reaction. After the reaction, the reaction mixture was poured into a large amount of deionized water to precipitate a sulfonated polymer. The polymer was washed with deionized water until the pH reached 7 and filtered to recover the sulfonated polymer, which was dried at 90° C. under vacuum. The yield of the sulfonated polymer was 159 g. The ion exchange capacity and the weight average molecular weight of this polymer were 2.3 meq/g and 185,000, respectively. The polymer thus obtained is represented by structural formula (A-N1). The polymer having the sulfonic acid group is designated as polymer A-N1.

(Formula 26)

Constitutional Formula A-N1

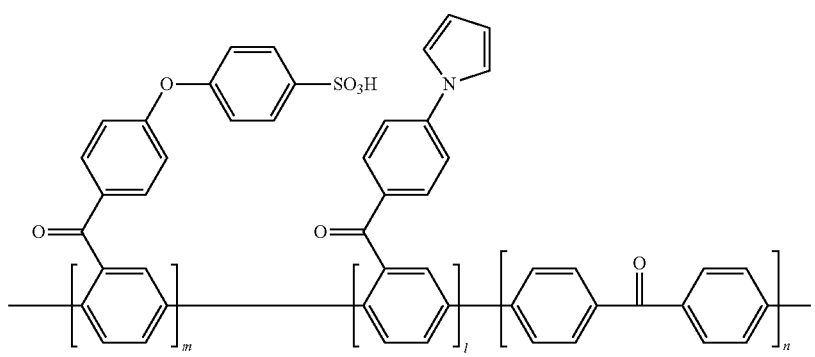

polymer A-N1

Polymerization Example 2

(1) Synthesis of Hydrophobic Unit B

A charge of 29.8 g (104 mmol) of 4,4'-dichlorodiphenyl sulfone, 37.4 g (111 mmol) of 2,2-bis(4-hydroxyphenyl)-1,1,1,3,3,3-hexafluoropropane and 20.0 g (145 mmol) of potassium carbonate was weighed into a 1-L three-neck flask equipped with a stirrer, a thermometer, a Dean-Stark tube, a nitrogen gas introducing tube and a cooling tube. After purging the flask with nitrogen gas, 168 ml of sulforane and 84 mL of toluene were added to the reaction mixture, and the resultant mixture was stirred. The reaction solution was heated to 150° C. under reflux over an oil bath. Water formed by the reaction was trapped in the Dean-Stark tube. After 3 hours, when the formation of water was hardly observed, toluene was removed through the Dean-Stark tube to outside of the system. The reaction temperature was gradually raised to 200° C. and stirring of the reaction solution was continued for 5 hours, to which 7.5 g (30 mmol) of 4,4'-dichlorobenzophenone was added to further continue the reaction for 8 hours. After the reaction solution was left for cooling, 100 mL of toluene was added to dilute the reaction solution. Inorganic salts insoluble in the reaction solution were filtered and the filtrate was poured into 2 L of methanol to precipitate a product. The product precipitated was filtered, dried and then dissolved in 250 mL of tetrahydrofuran, which was poured into 2 L of methanol for reprecipitation. Powder in white color precipitated was filtered and dried to yield 56 g of hydrophobic unit B. The number average molecular weight (Mn) determined by GPC was 10,500. The compound obtained is represented by structural formula (B1).

(2) Synthesis of Sulfonated Polymer Containing Nitrogen-Containing Heterocyclic Group B-N1

A charge of 141.6 g (338 mmol) of neopentyl 3-(2,5-dichlorobenzoyl)benzenesulfonate, 44.5 g (4.2 mmol) of hydrophobic unit B with Mn of 10,500 obtained above, 5.4 g (16.9 mmol) of 2,5-dichloro-4'-(1-imidazolyl)benzophenone obtained in Synthesis Example 1, 6.71 g (10.3 mmol) of bis(triphenylphosphine)nickel dichloride, 1.54 g (10.3 mmol) of sodium iodide, 35.9 g (137 mmol) of triphenylphosphine and 53.7 g (820 mmol) of zinc was weighed into a 1-L three-neck flask equipped with a stirrer, a thermometer, and a nitrogen gas introducing tube, and the atmosphere was replaced with a dry nitrogen gas. After addition of 430 mL of N,N-dimethylacetamide (DMAc), the reaction solution was kept at the reaction temperature of 80° C. and stirred for 3 hours. The reaction solution was diluted by adding 730 mL of DMAc and the resulting solution was filtered to remove insoluble matter. The solution obtained was charged into a 2-L three-neck flask equipped with a stirrer, a thermometer and a nitrogen gas introducing tube, and heated to 115° C. with stirring, to which 44 g (506 mmol) of lithium bromide was added. After stirring for 7 hours, the reaction solution was poured into 5 L of acetone to precipitate a product. The product was then washed with 1-N hydrochloric acid and deionized water in this order and then dried to yield 124 g of a targeted sulfonated polymer. The weight average molecular weight (Mw) of the obtained polymer was 166,000. The polymer obtained is presumed to be a sulfonated polymer represented by formula (II). The ion exchange capacity of this polymer was 2.3 meq/g. The polymer having the sulfonic acid group thus obtained is represented by structural formula B-N1 and designated as polymer B-N1.

(Formula 27)

Constitutional Formula B-1

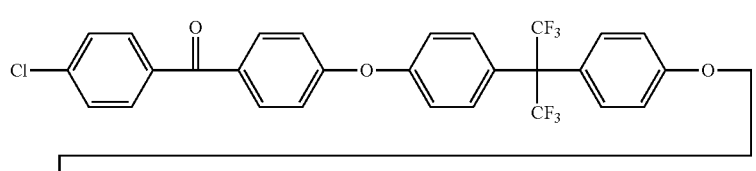
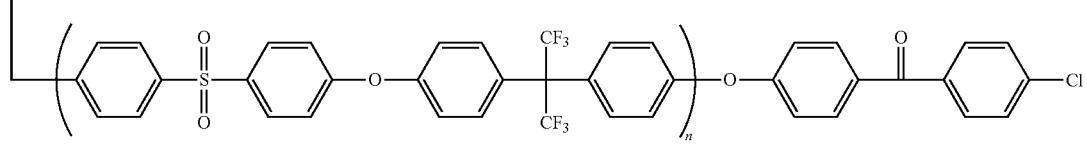

Hydrophobic Unit B (Formula 28)

Constitutional Formula B-N1

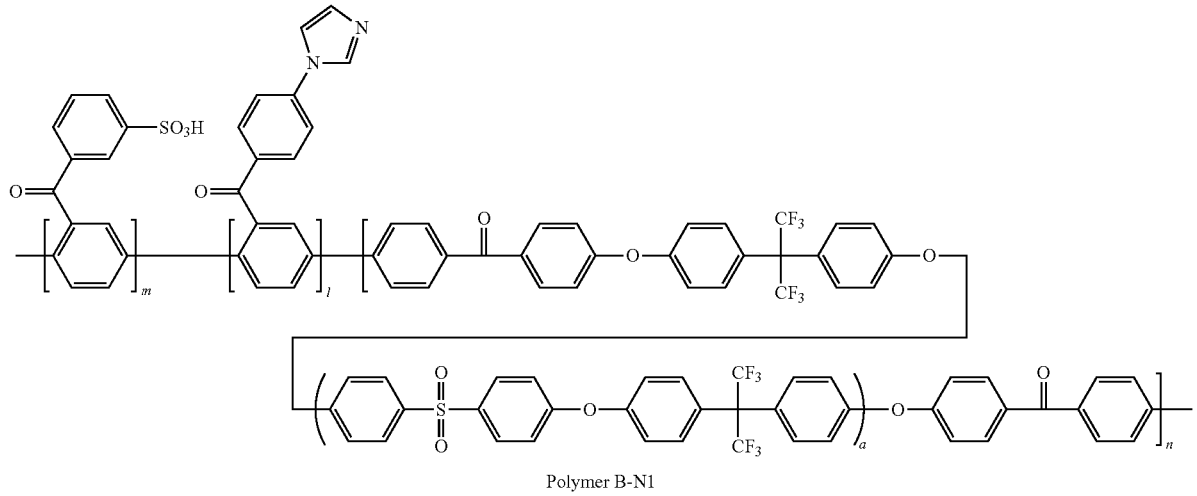

Polymer B-N1

Polymerization Example 3

(1) Synthesis of Hydrophobic Unit C

A charge of 67.3 g (0.20 mol) of 2,2-bis(4-hydroxyphenyl)-1,1,1,3,3,3-hexafluoropropane, 60.3 g (0.24 mol) of 4,4'-dichlorobenzophenone (4,4'-DCBP), 71.9 g (0.52 mol) of potassium carbonate, 300 mL of N,N-dimethylacetamide (DMAc) and 150 mL of toluene was into a 1-L three-neck flask equipped with a stirrer, a thermometer, a cooling tube, a Dean-Stark tube, and a three-way cock for introducing nitrogen gas. The flask was heated on an oil bath under nitrogen atmosphere while stirring at 130° C. for reaction. The reaction was continued by removing water generated in the reaction through the Dean-Stark tube to outside of the reaction system while the water was subjected to azeotropic boiling with toluene. After about 3 hours of the reaction time, almost no water generation was observed. The reaction temperature was gradually raised from 130° C. to 150° C. The reaction temperature was then gradually raised to 200° C. to remove most of the toluene and the reaction was continued at 200° C. for 10 hours. The reaction was continued further for 5 hours by adding 10.0 g (0.040 mol) of 4,4'-DCBP. After the reaction solution was left for cooling, a precipitate of by-product inorganic compounds was eliminated by filtration and the filtrate was poured into 4 L of methanol. A product precipitated was filtered, collected and dried, and then was dissolved in 300 mL of tetrahydrofuran. The resulting solution was poured into 4 L of methanol for reprecipitation to yield 95 g (yield 85%) of a targeted polymer.

The number average molecular weight of the obtained polymer relative to polystyrene standards was determined by GPC (THF solvent) to give 11,200. The polymer obtained is an oligomer represented by structural formula C-1.

(Formula 29)

Constitutional Formula C-1

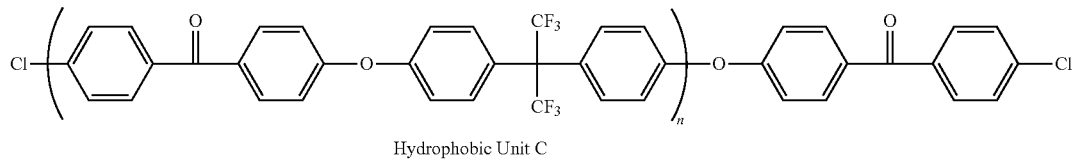

Hydrophobic Unit C

(2) Synthesis of Sulfonated Polymer Containing Nitrogen-Containing Heterocyclic Group C-N1

A 100 mL aliquot of dried N,N-dimethylacetamide (DMAc) was added under nitrogen to a mixture of 27.21 g (38.6 mmol) of compound monomer C represented by the following structural formula C-2, 16.13 g (1.44 mmol) of hydrophobic unit synthesized in (1), 0.80 g (1.93 mmol) of 2,5-dichloro-4'-(2-benzothiazolethioxy)benzophenone obtained in Synthesis Example 3, 0.79 g (1.2 mmol) of bis(triphenylphosphine)nickel dichloride, 4.20 g (16.0 mmol) of triphenylphosphine, 0.18 g (1.20 mmol) of sodium iodide and 6.28 g (96.1 mmol) of zinc.

The reaction system was heated with stirring (finally heated to 79° C.) for 3 hours. Increase in the viscosity of the system was observed in the course of the reaction. The polymerization reaction solution was diluted with 425 mL of DMAc and the resulting solution was stirred for 30 minutes and filtered using celite as a filtering auxiliary agent.

A part of the filtrate was poured into methanol for coagulation. The molecular weight of the copolymer having a sulfonic acid derivative protected by the neopentyl group was measured with GPC to give Mn=57,500 and Mw=175,300.

The above filtrate was concentrated to 344 g by an evaporator and 10.1 g (0.116 mol) of lithium bromide was added to the filtrate, which was reacted under nitrogen atmosphere at an internal temperature of 110° C. for 7 hours. After the reaction, the reaction solution was cooled to room temperature and poured into 4 L of acetone for coagulation. The coagulate was collected by filtration, air-dried, then crushed by a mixer and washed with 1500 mL of 1-N hydrochloric acid with stirring. After filtration, the product was washed with ion-exchanged water until the pH of washing reached 5 or more and then dried overnight at 80° C. to yield 23.0 g of a targeted sulfonated polymer. The molecular weight of the sulfonated polymer after deprotection was Mn=63,000 and Mw=194,000. The ion exchange capacity of this polymer was 2.0 meq/g. Polymer C having the sulfonic acid group obtained is the compound represented by structural formula F (polymer CN-1).

Dean-Stark tube to outside of the reaction system while the water was subjected to azeotropic boiling with toluene. After about 3 hours of the reaction time, almost no water generation was observed. The reaction temperature was gradually raised to remove most of toluene and the reaction was continued at 200° C. for 3 hours. Next, 12.3 g (0.072 mol) of 2,6-dichlorobezonitrile was added to the reaction solution and the reaction was further continued for 5 hours.

After the reaction solution obtained was left for cooling, it was diluted by adding 100 mL of toluene. A precipitate of by-product inorganic compounds was eliminated by filtration and the filtrate was poured into 2 L of methanol. The product precipitated was filtered, recovered, dried and then dissolved in 250 mL of tetrahydrofuran. The resulting solution was poured into 2 L of methanol for reprecipitation, yielding 107 g of a targeted compound.

The number average molecular weight of the targeted obtained compound relative to polystyrene standards was (Formula 30)

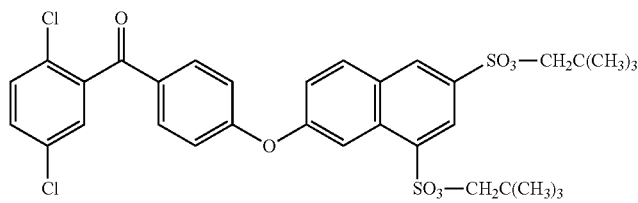

Constitutional Formula C-2

Monomer C (Formula 31)

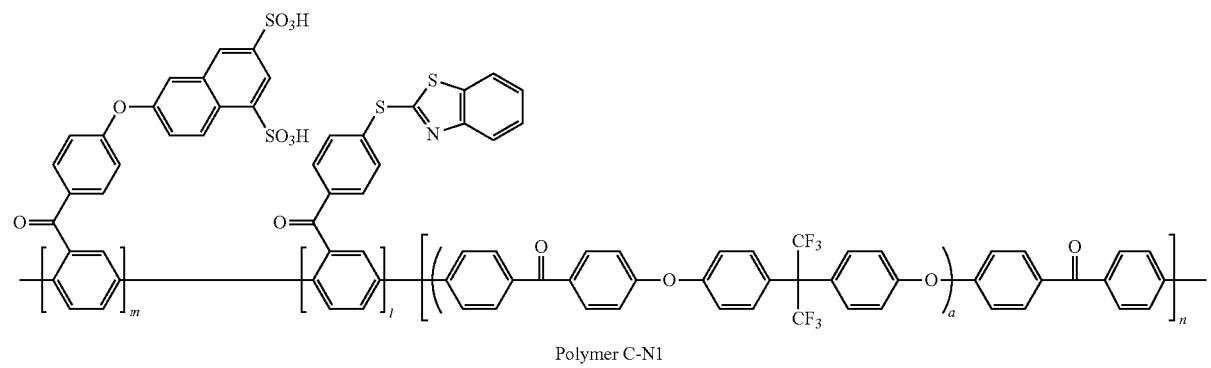

Constitutional Formula C-N1

Polymer C-N1

Polymerization Example 4

(1) Synthesis of Hydrophobic Unit D

A charge of 49.4 g (0.29 mol) of 2,6-dichlorobenzonitrile, 88.4 g (0.26 mol) of 2,2-bis(4-hydroxyphenyl)-1,1,1,3,3,3-hexafluoropropane and 47.3 g (0.34 mol) of potassium carbonate was weighed into a 1-L three-neck flask equipped with a stirrer, a thermometer, a cooling tube, a Dean-Stark tube, and a three-way cock for the introduction of nitrogen gas. After replacing the atmosphere with a nitrogen gas, 346 mL of sulfolane and 173 mL of toluene were added to the reaction solution with stirring. The flask was immersed in an oil bath and heated to 150° C. under reflux. The reaction was continued by removing water generated in the reaction through the determined by GPC to give 7,300. The compound obtained is an oligomer represented by structural formula D-1.

(Formula 32)

Constitutional Formula D-1

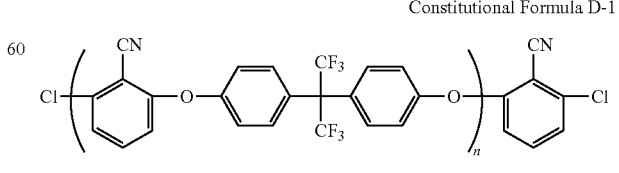

Hydrophobic Unit D

(2) Synthesis of Sulfonated Polymer Containing Nitrogen-Containing Heterocyclic Group D-N1

A 540 mL aliquot of dried N,N-dimethylacetamide (DMAc) was added under nitrogen to a mixture of 135.0 g (336 mmol) of neopentyl 3-(2,5-dichlorobenzoyl)benzenesulfonate, 40.7 g (5.6 mmol) of hydrophobic unit D synthesized in (1), 6.71 g (16.8 mmol) of 2,5-dichloro-4'-(1-imidazolyl)benzophenone obtained in Synthesis Example 2, 6.71 g (10.3 mmol) of bis(triphenylphosphine)nickel dichloride, 35.9 g (137 mmol) of triphenylphosphine, 1.54 g (10.3 mmol) of sodium iodide and 53.7 g (821 mmol) of zinc.

The reaction system was heated with stirring (finally heated to 79° C.) for 3 hours. Increase in the viscosity of the system was observed in the course of the reaction. The polymerization reaction solution was diluted with 730 mL of DMAc and the resulting solution was stirred for 30 minutes and filtered using celite as a filtering auxiliary agent.

A part of the filtrate was poured into methanol for coagulation. The molecular weight of the copolymer having a sulfonic acid derivative protected by the neopentyl group was measured with GPC to give Mn=58,000 and Mw=135,300.

The above filtrate was concentrated by an evaporator and 43.8 g (505 mmol) of lithium bromide was added to the filtrate, which was reacted under nitrogen atmosphere at an internal temperature of 110° C. for 7 hours. After the reaction, the reaction solution was cooled to room temperature and poured into 4 L of acetone for coagulation. The coagulate was collected by filtration, air-dried, then crushed by a mixer and washed with 1500 mL of 1-N hydrochloric acid with stirring. After filtration, the product was washed with ion-exchanged water until the pH of washing reached 5 or more and then dried overnight at 80° C. to yield 23.0 g of a targeted sulfonated polymer. The molecular weight of the sulfonated polymer after deprotection was Mn=60,000 and Mw=175,000. The ion exchange capacity of this polymer was 2.4 meq/g. Polymer D-N1 having the sulfonic acid group obtained is the compound represented by structural formula D-2.

Comparative Polymerization Example 1

Synthesis of Sulfonated Polymer RA

A charge of 185.3 (540 mmol) of 2,5-dichloro-4'-phenoxybenzophenone, 15.1 g (60 mmol) of 4,4'-dichlorobenzophenone, 11.7 g (78 mmol) of sodium iodide, 11.8 g (18 mmol) of bis(triphenylphosphine)nickel dichloride, 63.0 g (240 mmol) of triphenylphosphine and 94.1 g (1.44 mol) of zinc was weighed into a three-neck flask equipped with a cooling tube and a three-way cock. The flask was immersed in an oil bath at 70° C., and, after replacing the atmosphere with nitrogen, 1,000 mL of N-methyl-2-pyrrolidone was added under nitrogen atmosphere to initiate the reaction. After reacting for 20 hours, the polymerization reaction solution was diluted with 500 mL of N-methyl-2-pyrrolidone and the resulting mixture was poured into a hydrochloric acid/methanol solution in a weight ratio of 1/10 to precipitate a polymer, which was washed, filtered and dried under vacuum to yield powder in white color. The yield was 153 g. And the weight average molecular weight was 159,000. Sulfonation reaction was carried out at room temperature for 24 hours with stirring by adding 1500 mL of concentrated sulfuric acid to 150 g of this polymer. After the reaction, the reaction solution was poured into a large amount of deionized water to precipitate a sulfonated polymer. The polymer was washed with deionized water until the pH reached 7 and filtered to recover the sulfonated polymer, which was dried under vacuum at 90° C. The yield of the sulfonated polymer was 179 g. The ion exchange capacity and the weight average molecular weight of this polymer were 2.3 meq/g and 183,000, respectively. The polymer thus obtained is represented by structural formula (E). The polymer having the sulfonic acid group is designated as polymer RA.

(Formula 33)

Constitutional Formula D-2

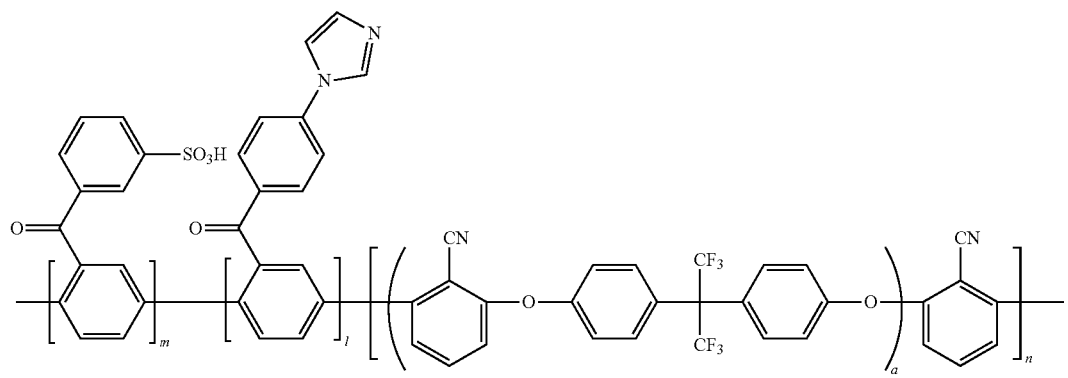

Polymer D-N1

(Formula 34)

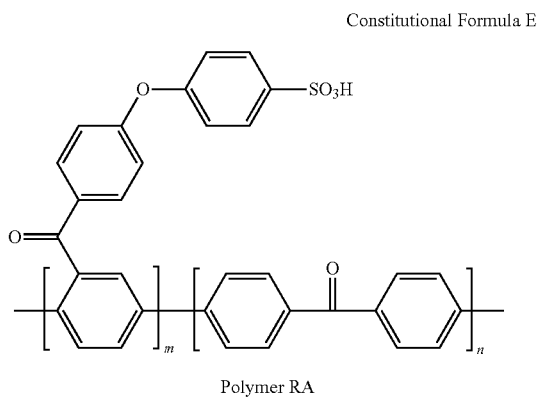

Constitutional Formula E

Polymer RA while keeping the reaction temperature at 80° C. and then diluted with 730 mL of DMAc to filter insoluble matters.

The solution obtained was charged into a 2-L three-neck flask equipped with a stirrer, a thermometer and a nitrogen gas introducing tube and heated to 115° C. with stirring, to which 44 g (506 mmol) of lithium bromide was added. After stirring for 7 hours, the reaction solution was poured into 5 L of acetone to precipitate a product. The product was washed with 1-N hydrochloric acid and deionized water in this order and then dried to yield 124 g of a targeted sulfonated polymer. The weight average molecular weight (Mw) of the obtained polymer was 170,000. The obtained polymer is presumed to be a sulfonated polymer represented by formula (II). The ion exchange capacity of this polymer was 2.3 meq/g. The polymer having the sulfonic acid group thus obtained is represented by structural formula F and designated as polymer RB.

(Formula 35)

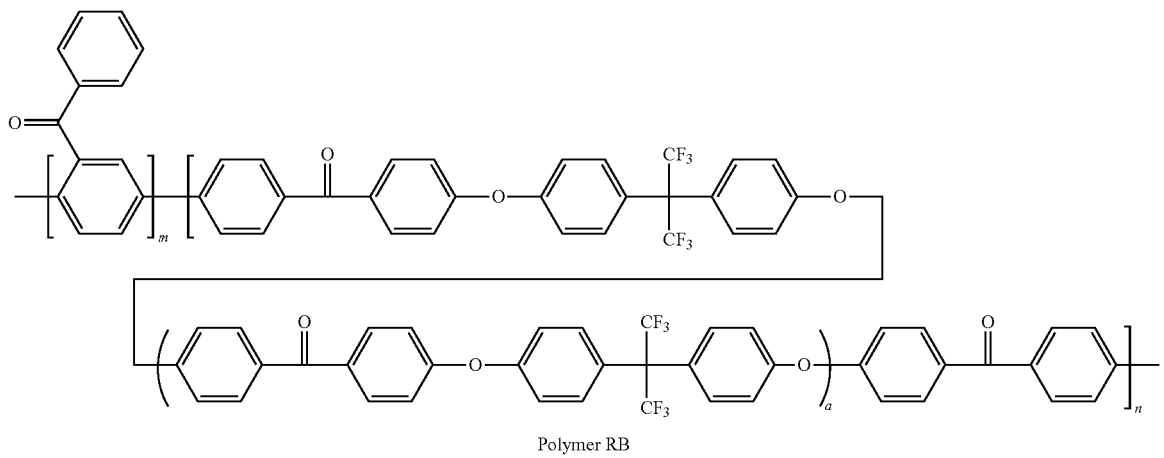

Constitutional Formula F

Polymer RB

Comparative Polymerization Example 2

Synthesis of Sulfonated Polymer RB

A charge of 141.5 (337 mmol) of neopentyl 3-(2,5-dichlorobenzoyl)benzenesulfonate, 48.5 (4.6 mmol) of hydrophobic unit D with Mn=10,500 obtained in Example 2 (1), 6.71 g (10.3 mmol) of bis(triphenylphosphine)nickel dichloride, 1.54 g (10.3 mmol) of sodium iodide, 35.9 g (137 mmol) of triphenylphosphine and 53.7 g (821 mmol) of zinc was weighed into a 1-L three-neck flask equipped with a stirrer, a thermometer and a nitrogen gas introducing tube and the atmosphere was replaced with a dry nitrogen gas. A 430 mL aliquot of N,N-dimethylacetamide (DMAc) was added to this mixture, and the resulting solution was stirred for 3 hours Comparative Polymerization Example 3

Synthesis of Sulfonated Polymer RC

A 100 mL aliquot of dried N,N-dimethylacetamide (DMAc) was added under nitrogen to a mixture of 27.18 g (38.5 mmol) of compound monomer C represented by the above structural formula C-2, 16.58 g (1.48 mmol) of hydrophobic unit synthesized in Polymerization Example 3 (1), 0.79 g (1.2 mmol) of bis(triphenylphosphine)nickel dichloride, 4.20 g (16.0 mmol) of triphenylphosphine, 0.18 g (1.20 mmol) of sodium iodide and 6.28 g (96.1 mmol) of zinc.

The reaction system was heated with stirring (finally heated to 79° C.) for 3 hours. Increase in the viscosity of the system was observed in the course of the reaction. The polymerization reaction solution was diluted with 425 mL of DMAc and the resulting mixture was stirred for 30 minutes and filtered using celite as a filtering auxiliary agent.

A part of the filtrate was poured into methanol for coagulation. The molecular weight of the copolymer having a sulfonic acid derivative protected by the neopentyl group was measured with GPC to give Mn=59,400 and Mw=178,300.

The above filtrate was concentrated by an evaporator to 344 g and 10.0 g (0.116 mol) of lithium bromide was added to the filtrate, which was reacted under nitrogen atmosphere at an internal temperature of 110° C. for 7 hours. After the reaction, the reaction solution was cooled to room temperature and poured into 4 L of acetone for coagulation. The coagulate was collected by filtration, air-dried, then crushed by a mixer and washed with 1500 mL of 1-N hydrochloric acid with stirring. After filtration, the product was washed with ion-exchanged water until the pH of washing reached 5 or more and then dried overnight at 80° C. to yield 23.0 g of a targeted sulfonated polymer. The molecular weight of the sulfonated polymer after deprotection was Mn=65,000 and Mw=197,000. The ion exchange capacity of this polymer was 2.0 meq/g. Polymer RC having the sulfonic acid group obtained is the compound represented by structural formula G.

into a 1-L three-neck flask equipped with a stirrer, a thermometer and a nitrogen gas introducing tube. A 430 mL aliquot of dried N,N-dimethylacetamide (DMAc) was added to this mixture under nitrogen.

The reaction system was heated with stirring (finally heated to 79° C.) for 3 hours. Increase in the viscosity of the system was observed in the course of the reaction. The polymerization reaction solution was diluted with 730 mL of DMAc and the resulting mixture was stirred for 30 minutes and filtered using celite as a filtering auxiliary agent.

A part of the filtrate was poured into methanol for coagulation. The molecular weight of the copolymer having a sulfonic acid derivative protected by the neopentyl group was measured with GPC to give Mn=59,400 and Mw=138,300.

The above filtrate was concentrated by an evaporator, to which 44.0 g (506 mmol) of lithium bromide was added and the mixture was reacted under nitrogen atmosphere at an (Formula 36)

Constitutional Formula G

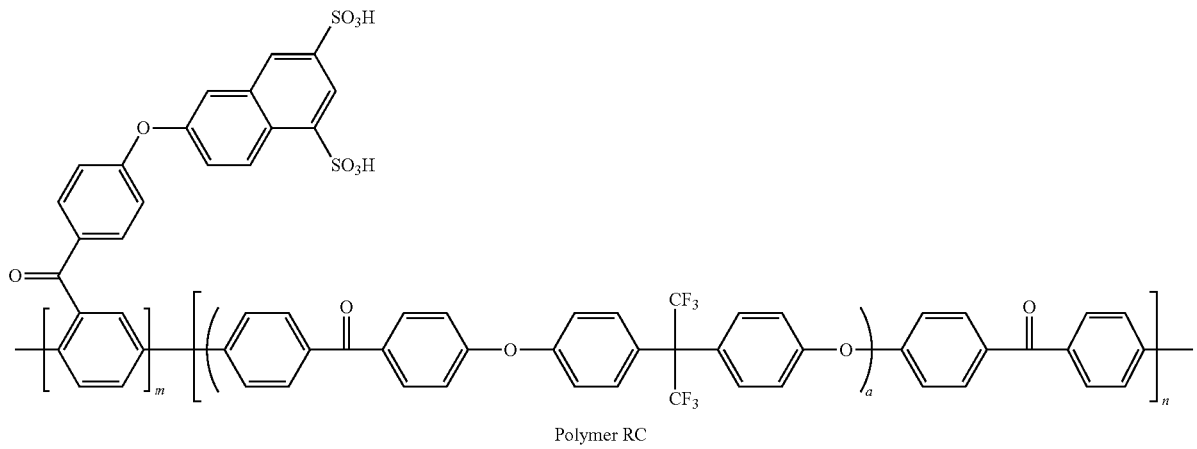

Polymer RC

Comparative Polymerization Example 4

Synthesis of Sulfonated Polymer RD

A charge of 134.6 g (336 mmol) of neopentyl 3-(2,5-dichlorobenzoyl)benzenesuflonate, 47.4 g (6.5 mmol) of hydrophobic unit D synthesized in Example 4 (1), 6.71 g (10.3 mmol) of bis(triphenylphosphine)nickel dichloride, 35.9 g (136 mmol) of triphenylphosphine, 1.54 g (10.3 mmol) of sodium iodide and 53.7 g (820 mmol) of zinc was weighed internal temperature of 110° C. for 7 hours. After the reaction, the reaction solution was cooled to room temperature and poured into 5 L of acetone for coagulation. The coagulate was collected by filtration, air-dried, then crushed by a mixer and washed with 1500 mL of 1-N hydrochloric acid with stirring. After filtration, the product was washed with ion-exchanged water until the pH of washing reached 5 or more and then dried overnight at 80° C. to yield 122 g of a targeted sulfonated polymer. The molecular weight of the sulfonated polymer after deprotection was Mn=68,000 and Mw=140,000. The ion exchange capacity of this polymer was 2.4 meq/g. The obtained Polymer RD having the sulfonic acid group is the compound represented by structural formula H.

(Formula 37)

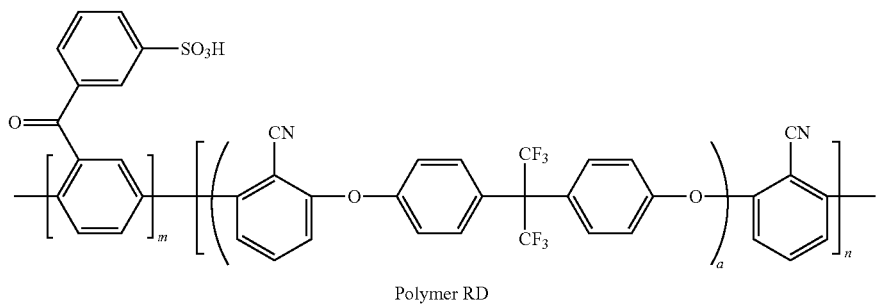

Constitututional Formula H

Polymer RD

Examples 1-4 and Comparative Examples 1-4

Sulfonated polyarylenes obtained in Examples 1-4 and Comparative Examples 1-4 (each corresponding to polymers A-N1, B-N1, C-N1 and D-N1 in Example and polymers RA, RB, RC and RD in Comparative Example) were dissolved in a mixed solvent of methanol/NMP in a weight ratio of 50/50 to form a 15% by weight solution, and a varnish of an electrode electrolyte was prepared. This varnish was processed by a cast method to form a 40 μm thick film. Films obtained were used to evaluate resistivity and heat resistance of the electrolyte. The results are shown in Table 1.

TABLE 1

| | Kinds of sulfonated polymers | Resistivity ($\Omega \cdot cm$) | Heat resistance test Amount of insoluble fraction (wt %) |
|---|---|---|---|
| Example 1 | A-N1 | 3.6 | 0 |
| Example 2 | B-N1 | 3.0 | 0 |
| Example 3 | C-N1 | 3.0 | 0 |
| Example 4 | D-N1 | 2.9 | 0 |
| Comparative Example 1 | RA | 3.6 | 80 |
| Comparative Example 2 | RB | 3.1 | 35 |
| Comparative Example 3 | RC | 3.0 | 15 |
| Comparative Example 4 | RD | 2.9 | 18 |

The results in Table 1 indicate that the introduction of the basic group did not cause significant reduction in resistivity, but exhibited good proton conductivity. In addition, introduction of the basic group also led to excellent heat resistance.

Example 5

Preparation of Paste A-N1

In a 50 ml glass bottle, 25 g of zirconia balls with diameter of 10 mm (trade name: YTZ ball manufactured by NIKKATO Corporation) were placed, and 1.51 g of platinum supported on carbon particles (Pt: 46% by weight loaded (TEC10E50E manufactured by Tanaka Kikinzoku Kogyo Co., Ltd.), 0.88 g of distilled water, 3.23 g of a 15% solution of sulfonated polyarylene A-N1 in water-1,2-dimethoxyethane (weight ratio=10:90) and 13.97 g of 1,2-dimethoxyethane were added to the bottle, which was stirred with a wave rotor for 60 minutes, yielding paste A-N1 with the viscosity of 50 cp (25° C.)

(Preparation of Gas Diffusion Layer)

Carbon black and polytetrafluoroethylene (PTFE) particles were mixed in a weight ratio of carbon black to PTFE particles at 4:6 and the mixture obtained was uniformly slurried in polyethylene glycol. The slurry was applied to one side of carbon paper and dried to form an undercoat layer, and two samples of diffusion layer 3 composed of the undercoat layer and carbon paper were prepared.

(Preparation of Gas Diffusion Electrode)

A doctor blade was used to apply paste A-N1 to the diffusion layer prepared as above such that the amount of platinum applied was 0.5 mg/cm². This was heated at 95° C. for 10 minutes to dry and form a gas diffusion electrode layer.

[Preparation of Membrane-Electrode Junction]

A sheet of an electrolyte membrane (membrane thickness, 40 μm) composed of polymer D-N1 prepared in Example 4 was made ready for use and sandwiched between a pair of the gas diffusion electrode layers prepared above. The resulting structure was molded by hot pressing under a pressure of 100 kg/cm² at 160° C. for 15 minutes to prepare a membrane-electrode junction.

(Evaluation of Power Generation)

A separator functioning as a gas channel was laminated to both sides of the membrane-electrode junction obtained as above to constitute a solid polymer-type fuel cell. This unit was used as a single cell in which one side was used as an oxygen electrode supplied with air, while the other side was used as a fuel electrode supplied with pure hydrogen, to generate electric power. Initial power generation characteristics were evaluated under the power generation conditions including the cell temperature of 95° C., the relative humidity on the air electrode side of 75%, the flow rate on the air electrode side of 4 L/min, the relative humidity on the fuel electrode side of 40% and the flow rate on the fuel electrode side of 1 L/min. Table 2 shows an output voltage at the current density of 1.0 A/cm². After the evaluation of initial characteristics, the power was continuously generated for 500 hours under the conditions including the cell temperature of 95° C., the relative humidity on the air electrode side of 75%, the flow rate on the air electrode side of 0.2 L/min, the relative humidity on the fuel electrode side of 40% and the flow rate on the fuel electrode side of 0.6 L/min while keeping the current density at 0.1 A/cm². After 500 hours, an output voltage at the current density of 1.0 A/cm² was measured under the same conditions as those used for evaluating initial power generation characteristics. Measured results are shown in Table 2.

Example 6

Preparation of Paste B-N1

All the preparation work was carried out similarly to Example 5 except that A-N1 in the sulfonated polyarylene in Example 5 was replaced with B-N1 to obtain electrode paste B-N1 with the viscosity of 55 cp (25° C.)

(Preparation of Gas Diffusion Electrode)

A doctor blade was used to apply paste B-N1 to a diffusion layer prepared similarly to Example 5 such that the amount of platinum applied was 0.5 mg/cm$^2$. This was heated at 95° C. for 10 minutes to dry and form a gas diffusion electrode layer.

(Preparation of Membrane-Electrode Junction)

A sheet of an electrolyte membrane (membrane thickness, 40 μm) composed of polymer D-N1 prepared in Example 4 was made ready for use and sandwiched between a pair of the gas diffusion electrode layers prepared above. The resulting structure was molded by hot pressing under a pressure of 100 kg/cm$^2$ at 160° C. for 15 minutes to prepare a membrane-electrode junction.

(Evaluation or Power Generation)

Power generation was evaluated similarly to Example 5. The results are shown in Table 2.

Example 7

Preparation of paste C-N1

All the preparation work was carried out similarly to Example 5 except that A-N1 in the sulfonated polyarylene in Example 5 was replaced with C-N1 to obtain electrode paste C-N1 with the viscosity of 53 cp (25° C.)

(Preparation of Gas Diffusion Electrode)

A doctor blade was used to apply paste C-N1 to a diffusion layer prepared similarly to Example 5 such that the amount of platinum applied was 0.5 mg/cm$^2$. This was heated at 95° C. for 10 minutes to dry and form a gas diffusion electrode layer.

(Preparation of Membrane-Electrode Junction)

A sheet of an electrolyte membrane (membrane thickness, 40 μm) composed of polymer D-N1 prepared in Example 4 was made ready for use and sandwiched between a pair of the gas diffusion electrode layers prepared above. The resulting structure was molded by hot pressing under a pressure of 100 kg/cm$^2$ at 160° C. for 15 minutes to prepare a membrane-electrode junction.

[Evaluation of Power Generation]

Power generation was evaluated similarly to Example 5.

Example 8

Preparation of Electrode Paste D-N1

All the preparation work was carried out similarly to Example 5 except that A-N1 in the sulfonated polyarylene in Example 5 was replaced with D-N1 to obtain electrode paste D-N1 with the viscosity of 53 cp (25° C.)

(Preparation of Membrane-Electrode Junction)

A sheet of an electrolyte membrane (membrane thickness, 40 μm) composed of polymer RD prepared in Comparative Example 4 was made ready for use. The electrode paste D-N1 prepared above was applied by a doctor blade to one side of the membrane such that the amount of platinum applied was 0.5 mg/cm$^2$. After this was heated at 95° C. for 10 minutes to dry, electrode paste D-N1 was similarly applied to the other side and dried. Both sides were sandwiched with a pair of the gas diffusion electrode layers prepared similarly to Example 5. The resulting structure was molded by hot pressing under a pressure of 100 kg/cm$^2$ at 160° C. for 15 minutes to prepare a membrane-electrode junction.

(Evaluation of Power Generation)

Power generation was evaluated similarly to Example 5.

Comparative Example 5

Preparation of Paste RA

In a 50 ml glass bottle, 25 g of zirconia balls with a diameter of 10 mm (trade name: YTZ ball manufactured by NIKKATO Corporation) were placed, to which 1.51 g of platinum supported on carbon particles (Pt: 46% by weight loaded (TEC10E50E manufactured by Tanaka Kikinzoku Kogyo Co., Ltd.), 0.88 g of distilled water, 3.23 g of a 15% solution of sulfonated polyarylene RA in water-1,2-dimethoxyethane (weight ratio=10:90) and 13.97 g of 1,2-dimethoxyethane were added, and the mixture was stirred with a wave rotor for 60 minutes, yielding paste RA with the viscosity of 50 cp (25° C.)

(Preparation of gas diffusion layer)

A gas diffusion layer was prepared similarly to Example 5.

(Preparation of Gas Diffusion Electrode)

A gas diffusion electrode was prepared similarly to Example 5.

(Preparation of Membrane-Electrode Junction)

A sheet of an electrolyte membrane (membrane thickness, 90 μm) composed of sulfonated polyarylene RD prepared in Comparative Example 4 was made ready for use and sandwiched between a pair of the gas diffusion electrode layers prepared above. The resulting structure was molded by hot pressing under a pressure of 100 kg/cm$^2$ at 160° C. for 15 minutes to prepare a membrane-electrode junction.

(Evaluation of Power Generation)

Power generation was evaluated similarly to Example 5. The results are shown in Table 2.

Comparative Example 6

Preparation of Paste RB

All the preparation work was carried out similarly to Comparative Example 5 except that RA in the sulfonated polyarylene in Comparative Example 5 was replaced with RB to obtain electrode paste RB with the viscosity of 53 cp (25° C.).

(Preparation of Gas Diffusion Layer)

A gas diffusion layer was prepared similarly to Example 5.

(Preparation of Gas Diffusion Electrode)

A gas diffusion electrode was prepared similarly to Example 5.

(Preparation of Membrane-Electrode Junction)

A sheet of an electrolyte membrane (membrane thickness, 40 μm) composed of sulfonated polyarylene RD prepared in Comparative Example 4 was made ready for use and sandwiched between a pair of the gas diffusion electrode layers prepared above. The resulting structure was molded by hot pressing under a pressure of 100 kg/cm² at 160° C. for 15 minutes to prepare a membrane-electrode junction.
(Evaluation of Power Generation)
Power generation was evaluated similarly to Example 5. The results are shown in Table 2.

Comparative Example 7

Preparation of Paste RC

All the preparation work was carried out similarly to Comparative Example 5 except that RA in the sulfonated polyarylene in Comparative Example 5 was replaced with RC to obtain electrode paste RC with the viscosity of 48 cp (25° C.).
(Preparation of Gas Diffusion Layer)
A gas diffusion layer was prepared similarly to Example 5.
(Preparation of Gas Diffusion Electrode)
A gas diffusion electrode was prepared similarly to Example 5.
(Preparation of Membrane-Electrode Junction)
A sheet of an electrolyte membrane (membrane thickness, 40 μm) composed of sulfonated polyarylene RD prepared in Comparative Example 4 was made ready for use and sandwiched between a pair of the gas diffusion electrode layers prepared above. The resulting structure was molded by hot pressing under a pressure of 100 kg/cm² at 160° C. for 15 minutes to prepare a membrane-electrode junction.
(Evaluation of Power Generation)
Power generation was evaluated similarly to Example 5. The results are shown in Table 2.

Comparative Example 8

Preparation of Paste RD

All the preparation work was carried out similarly to Comparative Example 5 except that RA in the sulfonated polyarylene in Comparative Example 5 was replaced with RD to obtain electrode paste RD with the viscosity of 49 cp (25° C.)
(Preparation of Gas Diffusion Layer)
The same gas diffusion layer as Comparative Example 5 was used.
(Preparation of Membrane-Electrode Junction)
A sheet of an electrolyte membrane (membrane thickness, 40 μm) composed of sulfonated polyarylene RD prepared in Comparative Example 4 was made ready for use. The electrode paste RD prepared above was applied by a doctor blade on one side of the membrane such that the amount of platinum applied was 0.5 mg/cm². After this was heated at 95° C. for 10 minutes to dry, electrode paste RD was similarly applied to the other side and dried. Both sides were sandwiched with the gas diffusion electrode layers prepared similarly to Example 5. The resulting structure was molded by hot pressing under a pressure of 100 kg/cm² at 160° C. for 15 minutes to prepare a membrane-electrode junction.
[Evaluation of Power Generation]
Power generation was evaluated similarly to Example 5. The results are shown in Table 2.

Comparative Example 9

Preparation of paste RE

In a 50 ml glass bottle, 25 g of zirconia balls with a diameter of 10 mm (trade name: YTZ ball manufactured by NIKKATO Corporation) were placed, to which 1.51 g of platinum supported on carbon particles (Pt: 46% by weight loaded (TEC10E50E manufactured by Tanaka Kikinzoku Kogyo Co., Ltd.), 0.88 g of distilled water, 2.42 g of a 20% by weight solution of Nafion manufactured by Dupont, Ltd. and 14.78 g of n-propanol were added and the resulting mixture was stirred with a wave rotor for 60 minutes to obtain paste RE with the viscosity of 47 cp (25° C.)
(Preparation of Gas Diffusion Layer)
A gas diffusion layer was prepared similarly to Example 5.
(Preparation of Gas Diffusion Electrode)
A gas diffusion electrode was prepared similarly to Example 5.
(Preparation of Membrane-Electrode Junction)
A sheet of an electrolyte membrane (membrane thickness, 40 μm) composed of sulfonated polyarylene RD prepared in Comparative Example 4 was made ready for use and sandwiched between a pair of the gas diffusion electrode layers prepared above. The resulting structure was molded by hot pressing under a pressure of 100 kg/cm² at 160° C. for 15 minutes to prepare a membrane-electrode junction.
[Evaluation of Power Generation]
Power generation was evaluated similarly to Example 5. The results are shown in Table 2.

TABLE 2

|  | Kinds of sulfonated polymer for electrode | Kinds of sulfonated polymer for membrane | Cell voltage (V @ 1.0 A/cm²) | |
| --- | --- | --- | --- | --- |
|  |  |  | 0 hour | 500 hours |
| Example 5 | A-N1 | D-N1 | 0.55 | 0.53 |
| Example 6 | B-N1 | D-N1 | 0.54 | 0.50 |
| Example 7 | C-N1 | D-N1 | 0.52 | 0.49 |
| Example 8 | D-N1 | RD | 0.53 | 0.45 |
| Comparative Example 5 | RA | RD | 0.52 | 0.28 |
| Comparative Example 6 | RB | RD | 0.53 | 0.23 |
| Comparative Example 7 | RC | RD | 0.51 | 0.19 |
| Comparative Example 8 | RD | RD | 0.52 | 0.20 |
| Comparative Example 9 | Nafion | RE | 0.53 | 0.18 |

Table 2 indicates that a solid polymer-type fuel cell containing the electrode electrolyte having a sulfonated polyarylene having a nitrogen-containing heterocyclic aromatic group can keep and achieve a stable output in power generation at high temperature for a long period of time as compared with that not containing the nitrogen-containing heterocyclic aromatic group.

The invention claimed is:

1. A varnish incorporated into a solid polymer electrolyte fuel cell which comprises a solvent and an electrode electrolyte for a solid polymer fuel cell electrolyte, comprising a polymer with a structure having a main chain including a polyphenylene, a side chain including a sulfonic acid group and a repeating structural unit represented by formula (C) as a side chain including a nitrogen-containing heterocyclic group

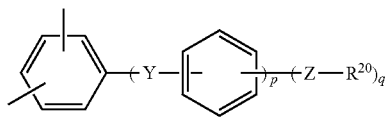

(C)

wherein
- Z is at least one structure selected from the group consisting of a direct bond, —O— and —S—, Y represents at least one kind of structure selected from the group consisting of —CO—, —SO$_2$—, —SO—, —CONH—, —COO—, —(CF$_2$)$_l$— wherein l is an integer of 1 to 10, and —C(CF$_3$)$_2$— and
- R$^{20}$ represents a nitrogen-containing heterocyclic group, q representing an integer of 1 to 5 and p representing an integer of 0 to 4,
- wherein the solvent is at least one solvent selected from water, alcohols, ethers, ketones, esters, aprotic polar solvents and hydrocarbon solvents, and the solvent is used at 5 to 95% by weight in terms of the weight ratio.

2. The varnish incorporated into a solid polymer electrolyte fuel cell according to claim 1, wherein the nitrogen-containing heterocyclic group is at least one kind of a group derived from a compound selected from the group consisting of nitrogen-containing heterocyclic compounds including pyrrole, thiazole, isothiazole, oxazole, isoxazole, pyridine, imidazole, imidazoline, pyrazole, 1,3,5-triazine, pyrimidine, pyridazine, pyrazine, indole, quinoline, isoquinoline, purine, benzimidazole, benzoxazole, benzothiazole, tetrazole, tetrazine, triazole, carbazole, acridine, quinoxaline and quinazoline and a derivative thereof.

3. The varnish incorporated into a solid polymer electrolyte fuel cell according to claim 1 or 2, wherein the side chain including a sulfonic acid group is represented by the following general formula (E):

(Formula 2)

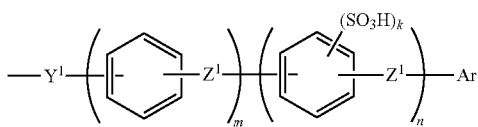

(E)

wherein (Formula 5)

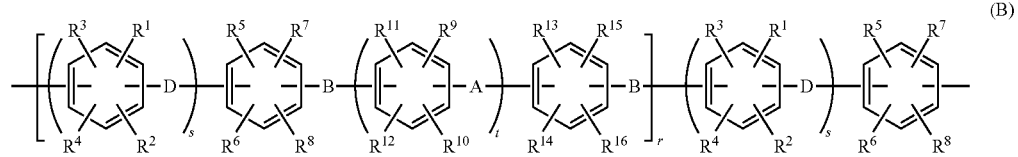

(B)

Y$^1$ represents at least one kind of structure selected from the group consisting of —CO—, —SO$_2$—, —SO—, —CONH—, —COO—, —(CF$_2$)$_l$— wherein l is an integer of 1 to 10, and —C(CF$_3$)$_2$—, Z$^1$ represents at least one kind of structure selected from the group consisting of a direct bond, —(CH$_2$)$_l$— (wherein l is an integer of 1 to 10), —C(CH$_3$)$_2$—, —O— and —S— and Ar represents an aromatic group having a substituent represented by —SO$_3$H, —O(CH$_2$)$_h$SO$_3$H or —O(CF$_2$)$_h$SO$_3$H, h representing an integer of 1 to 12, m representing an integer of 0 to 10, n representing an integer of 0 to 10 and k representing an integer of 1 to 4.

4. The varnish incorporated into a solid polymer electrolyte fuel cell according to claim 1 or 2 a repeating unit represented by the following general formula (A):

(Formula 4)

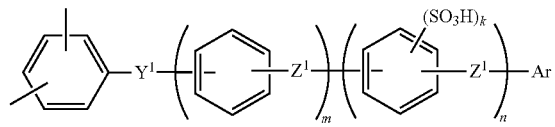

(A)

wherein
- Y$^1$ represents at least one kind of structure selected from the group consisting of —CO—, —SO$_2$—, —SO—, —CONH—, —COO—, —(CF$_2$)$_l$— (l is an integer of 1 to 10) and —C(CF$_3$)$_2$—, Z$^1$ represents at least one kind of structure selected from the group consisting of a direct bond, —(CH$_2$)$_l$— wherein l is an integer of 1 to 10, —C(CH$_3$)$_2$—, —O— and —S— and Ar represents an aromatic group having substituents represented by —SO$_3$H or —O(CH$_2$)$_h$SO$_3$H or —O(CF$_2$)$_h$SO$_3$H, h representing an integer of 1 to 12, m representing an integer of 0 to 10, n representing an integer of 0 to 10 and k representing an integer of 1 to 4.

5. The varnish incorporated into a solid polymer electrolyte fuel cell according to claim 1 or 2, wherein the polymer further has a structure represented by the following general formula (B):

wherein
A and D independently represent at least one kind of structure selected from the group consisting of a direct bond, —CO—, —SO$_2$—, —SO—, —CONH—, —COO—, —(CF$_2$)$_l$— wherein l is an integer of 1 to 10 and —(CH$_2$)$_l$—, wherein l is an integer of 1 to 10, —CR'$_2$— (R' represents aliphatic hydrocarbon, aromatic hydrocarbon or halogenated hydrocarbon groups), cyclohexylidene, fluorenylidene, —O— and —S, B is independently an oxygen or sulfur atom and $R^1$ to $R^{16}$ may be the same or different from one another and represent at least one kind of atom or group selected from the group consisting of hydrogen atom, fluorine atom, alkyl, partially or fully halogenated alkyl, allyl, aryl, nitro and nitrile, s and t representing an integer of 0 to 4 and r representing an integer of 0 or 1 or larger but not more than 100.

* * * * *